(12) United States Patent
Ramorini et al.

(10) Patent No.: US 10,116,208 B2
(45) Date of Patent: Oct. 30, 2018

(54) DC-DC CONVERTER WITH IMPROVED ENERGY MANAGEMENT, METHOD FOR OPERATING THE DC-DC CONVERTER, ENVIRONMENTAL ENERGY HARVESTING SYSTEM USING THE DC-DC CONVERTER, AND APPARATUS USING THE ENERGY HARVESTING SYSTEM

(71) Applicant: STMicroelectronics S.r.l., Agrate Brianza (IT)

(72) Inventors: Stefano Ramorini, Arluno (IT); Alessandro Gasparini, Cusano Milanino (IT); Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 342 days.

(21) Appl. No.: 14/603,597

(22) Filed: Jan. 23, 2015

(65) Prior Publication Data
US 2015/0214841 A1 Jul. 30, 2015

(30) Foreign Application Priority Data
Jan. 28, 2014 (IT) .............................. TO2014A0059

(51) Int. Cl.
*H02M 3/158* (2006.01)
*H02M 1/36* (2007.01)
*H02M 1/00* (2006.01)

(52) U.S. Cl.
CPC ............. *H02M 3/158* (2013.01); *H02M 1/36* (2013.01); *H02M 3/1582* (2013.01);
(Continued)

(58) Field of Classification Search
CPC ...... H02M 3/156; H02M 3/157; H02M 3/158; H02M 3/1582; H02M 3/1584; H02M 3/1586; H02M 3/1588
See application file for complete search history.

(56) References Cited

U.S. PATENT DOCUMENTS 9,099,919 B2 * 8/2015 Jing ...................... H02M 3/156
2008/0239774 A1 10/2008 Canfield et al.
(Continued)

FOREIGN PATENT DOCUMENTS

EP 2518878 A1 10/2012

OTHER PUBLICATIONS

IT Search Report and Written Opinion for IT TO2014A000059 dated Sep. 22, 2014 (8 pages).

*Primary Examiner* — Fred E Finch, III
*Assistant Examiner* — Rafael O De Leon Domenech
(74) *Attorney, Agent, or Firm* — Crowe & Dunlevy

(57) ABSTRACT

A converter includes an inductor configured to receive an input signal and output configured to supply an electrical load with an output signal. The converter operates to charge the inductor until a maximum pre-set current value is reached during a first operating condition in which the electrical load is not supplied. Next, the converter actively supplies the electrical load by partially discharging the inductor during a first time interval of a second operating condition. Then, the converter passively supplies the electrical load by the residual charge of the inductor during a second time interval, subsequent to the first time interval, of the second operating condition, by discharging the inductor completely.

15 Claims, 11 Drawing Sheets

(52) U.S. Cl.
CPC ........ *H02M 3/1588* (2013.01); *H02M 3/1584* (2013.01); *H02M 2001/0022* (2013.01); *H02M 2001/0032* (2013.01); *Y02B 70/1466* (2013.01); *Y02B 70/16* (2013.01)

(56) References Cited

U.S. PATENT DOCUMENTS

| | | |
|---|---|---|
| 2009/0262556 A1 | 10/2009 | Tomiyoshi et al. |
| 2011/0210713 A1 | 9/2011 | Kazama |
| 2012/0274134 A1* | 11/2012 | Gasparini ........... H02M 3/1584 307/31 |
| 2014/0145692 A1* | 5/2014 | Miyamae .............. H02M 3/158 323/271 |

* cited by examiner

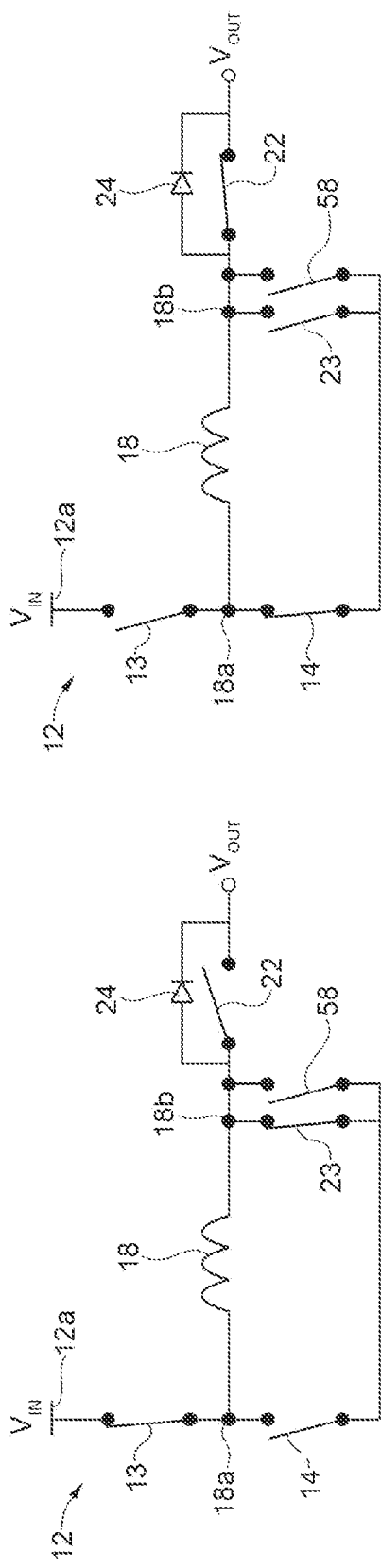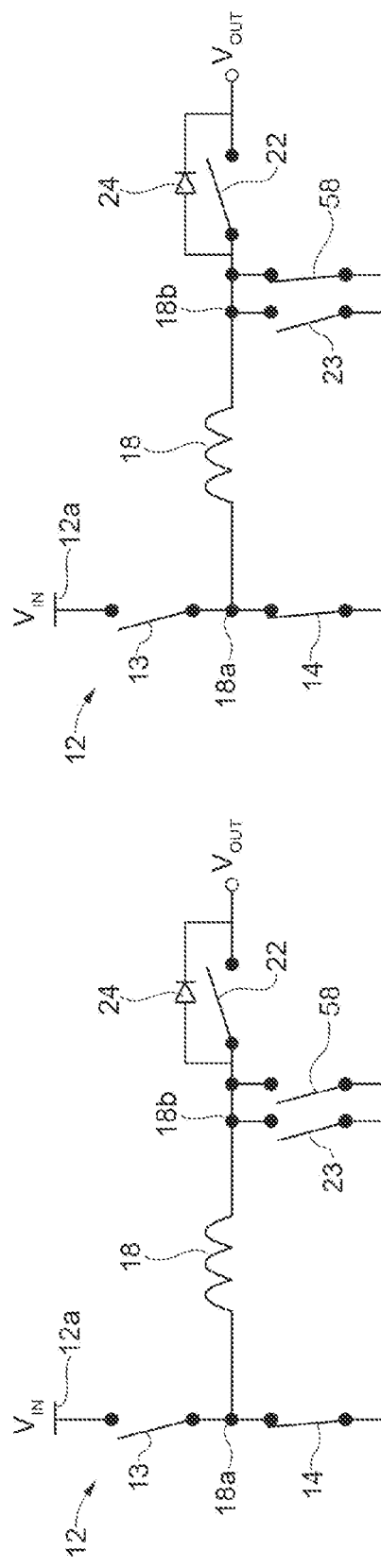

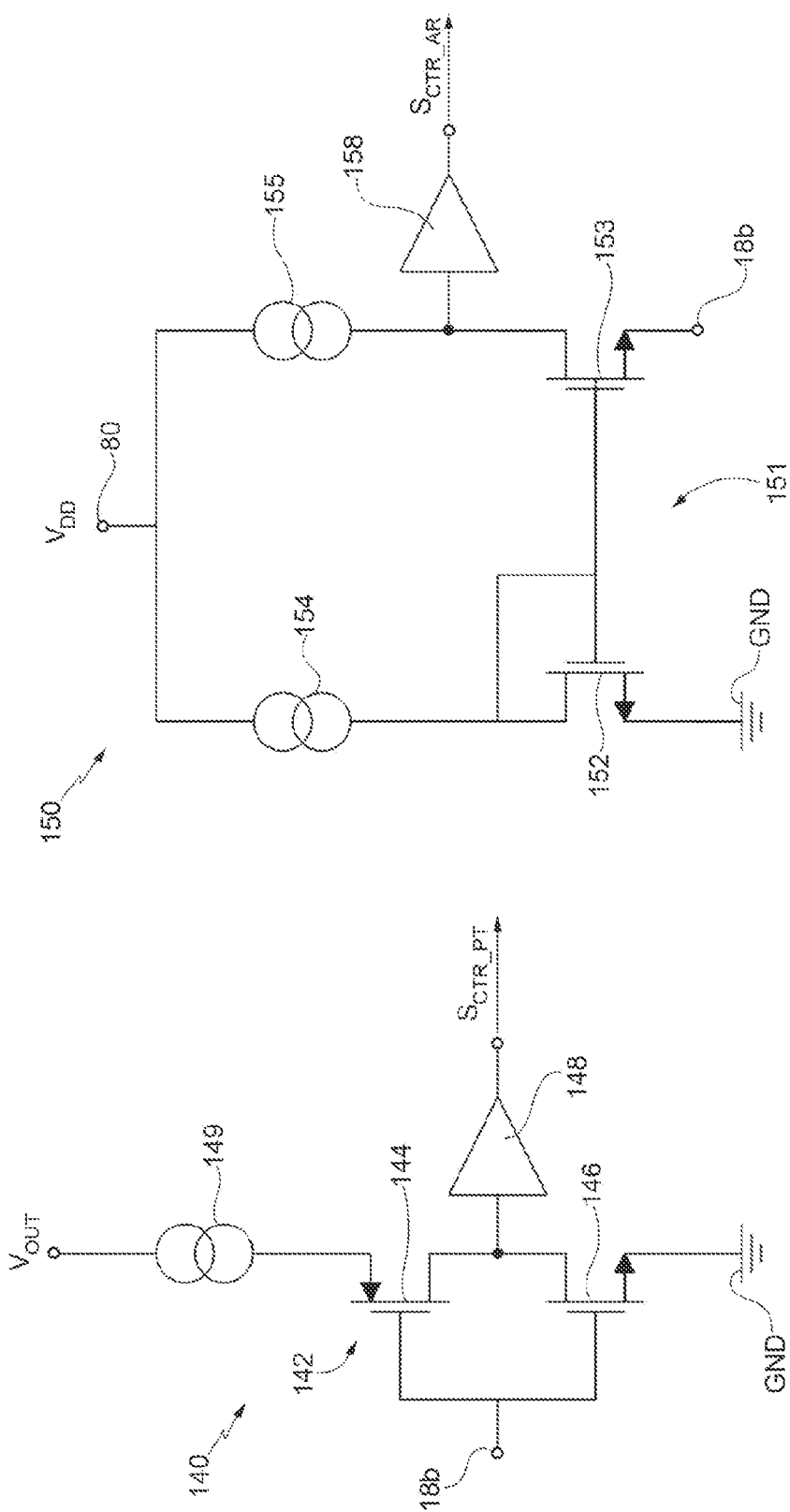

DC-DC CONVERTER WITH IMPROVED ENERGY MANAGEMENT, METHOD FOR OPERATING THE DC-DC CONVERTER, ENVIRONMENTAL ENERGY HARVESTING SYSTEM USING THE DC-DC CONVERTER, AND APPARATUS USING THE ENERGY HARVESTING SYSTEM

PRIORITY CLAIM

This application claims priority from Italian Application for Patent No. TO2014A000059 filed Jan. 28, 2014, the disclosure of which is incorporated by reference.

TECHNICAL FIELD

The disclosure relates to a DC-DC converter with improved energy management and to a method for operating the DC-DC converter. The disclosure further relates to an environmental energy harvesting system comprising the DC-DC converter and to an apparatus comprising said environmental energy harvesting system.

BACKGROUND

As is known, systems for harvesting energy (also known as "energy scavenging systems") from intermittent environmental energy sources (i.e., ones that supply energy in an irregular way) have aroused and continue to arouse considerable interest in a wide range of fields of technology. Typically, energy harvesting systems are configured to harvest, store and transfer energy generated by mechanical or thermal sources to a generic load of an electrical type.

Low-frequency vibrations, such as, for example, mechanical vibrations of disturbance in systems with moving parts may be a valid source of energy. The mechanical energy is converted, by one or more appropriate transducers (for example, piezoelectric or electromagnetic devices) into electrical energy, which may be used for supplying an electrical load. In this way, the electrical load does not require batteries or other supply systems that are cumbersome and present a low resistance in regard to mechanical stresses.

FIG. 1 is a schematic illustration in the form of functional blocks of an energy harvesting system of a known type.

The energy harvesting system 1 of FIG. 1 comprises: a transducer 2, for example of an electromagnetic or piezoelectric type, subject in use to environmental mechanical vibrations and configured to convert mechanical energy into electrical energy, typically into AC (alternating current) voltages; a scavenging interface 4, for example comprising a diode-bridge rectifier circuit (also known as Graetz bridge), configured to receive at input the AC signal generated by the transducer 2 and supplying at output a DC (direct current) signal for charging a capacitor 5 connected to the output of the rectifier circuit 4; and a DC-DC converter 6, connected to the capacitor 5 for receiving at input the electrical energy stored by the capacitor 5 and supplying it to an electrical load 8. Thus, the capacitor 5 has the function of element for storing energy, which is made available, when required, to the electrical load 8 for operation of the latter.

The transducer 2 is, for example, an electrochemical transducer, or an electromechanical transducer, or an electroacoustic transducer, or an electromagnetic transducer, or a photoelectric transducer, or an electrostatic transducer, or a thermoelectric transducer.

The main disadvantage of the configuration according to FIG. 1 regards the fact that the maximum voltage supplied at output by the scavenging interface 4 is limited by the input dynamics of the DC-DC converter 8.

In applications in which the transducer 2 converts mechanical energy into electrical energy in a discontinuous way and/or the power $P_{LOAD}$ required by the electrical load 8 varies significantly in time, also the voltage $V_{OUT}$ consequently has an evolution variable in time. This causes, for example, a variation of the efficiency factor of the DC-DC converter 6, which is inversely proportional to the value assumed by $V_{OUT}$. The maximum value of $V_{OUT}$ is further limited by the range of input voltages accepted by the DC-DC converter.

European Patent reference No. EP 2518878 (incorporated by reference) describes a DC-DC converter with a high efficiency factor even in conditions of light load and wide dynamic range of the input voltage. According to this reference, it is important to monitor the inductor current to prevent it from assuming negative values (i.e., to prevent energy from being absorbed by the electrical load). For this purpose, according to the reference, a current-detection circuit is provided, which constantly monitors the inductor current and uncouples the electrical load from the inductor when the current monitored assumes the zero value. A solution of this type requires, in the design step, an accurate trade-off between the desired accuracy of the measurement supplied by the current-detection circuit and the consumption of current of said current-detection circuit.

It is consequently desirable to have available a DC-DC converter that will enable management, in an efficient and, at the same time, accurate way, of supply of the electrical load connected thereto, preventing the DC-DC converter from absorbing energy from the load itself. It is likewise desirable for the management of supply of the load to be carried out automatically and with low current consumption.

SUMMARY

In an embodiment, a DC-DC converter is provided with improved energy management, a method for operating the DC-DC converter is provided, an energy harvesting system comprising the DC-DC converter is provided and an apparatus comprising the energy harvesting system that will enable the aforementioned advantages to be achieved is provided. In particular, the DC-DC converter enables a high efficiency factor to be maintained even in conditions of light load (e.g., 10 μW-100 μW) and of variable input and output voltages (e.g., 0.25 V-5 V at input, 1 V-5 V at output), minimizing the power consumption of the DC-DC converter.

BRIEF DESCRIPTION OF THE DRAWINGS

For a better understanding of the present invention, preferred embodiments thereof are now described, purely by way of non-limiting example and with reference to the attached drawings, wherein:

FIGS. 3A-3D show the converter of FIG. 2 in successive operating steps;

FIGS. 5-8 show respective circuits belonging to the converter of FIG. 2 for control of the inductor current in order to implement, respectively, the steps of FIGS. 4A-4D;

DETAILED DESCRIPTION OF THE DRAWINGS

Figure 2:
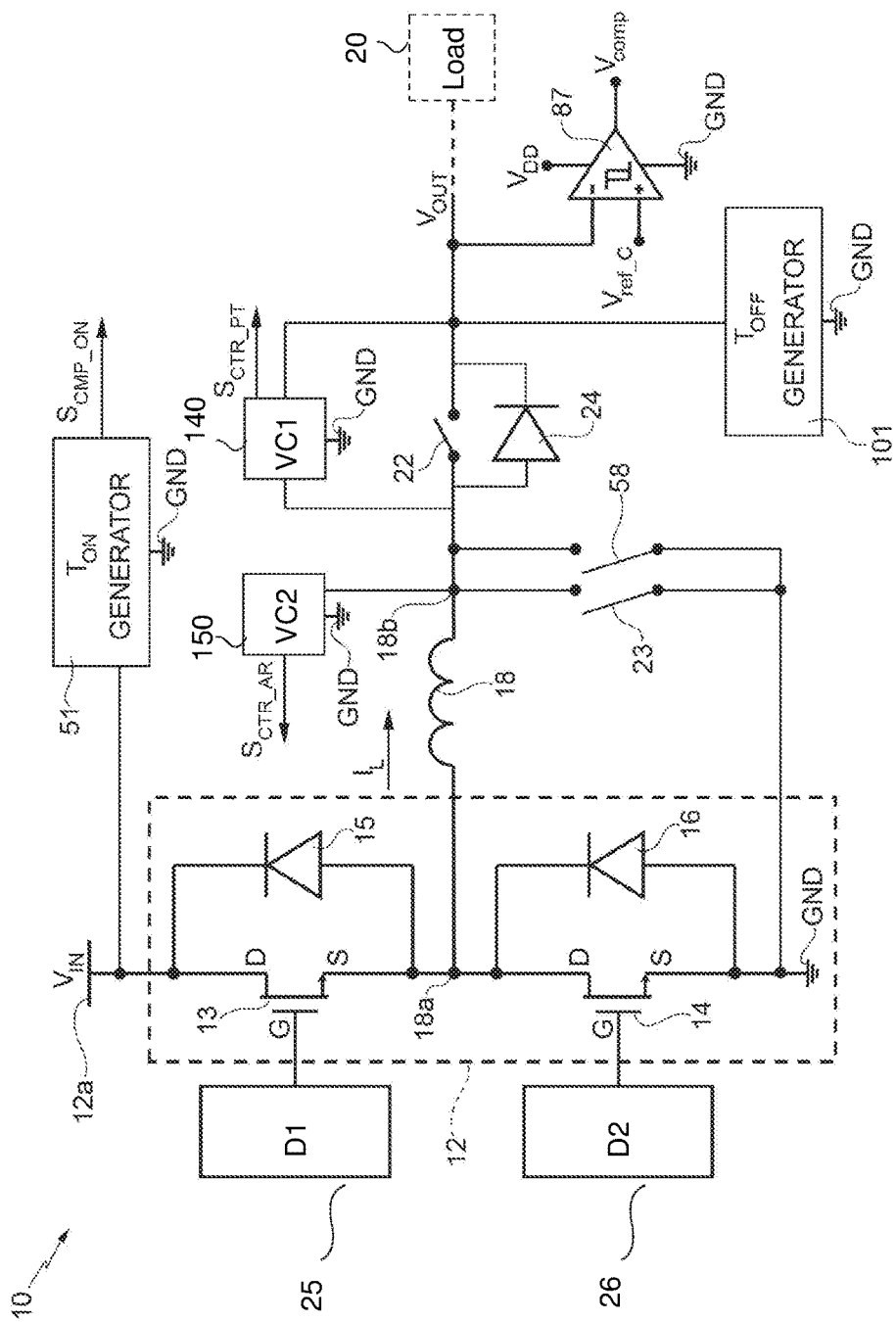
FIG. 2 is a schematic illustration of a DC-DC converter.

FIG. 2 is a schematic illustration of a converter 10, in particular configured to carry out a DC-DC conversion, of a buck-boost type, comprising an inductor 18 coupled to the input of the converter 10 and at least one output for supplying a respective load 20. This type of converter is also known as SISO (single-inductor single-output) converter. It is evident that, according to a different embodiment, the converter 10 may be of a SIMO (single-inductor multiple-output) type, having a plurality of outputs configured to supply a respective plurality of electrical loads.

For simplicity of description, in what follows reference will be made to a converter of a SISO type, without this implying any loss of generality.

In the description, reference will be made indifferently to switches "open" or "OFF" to indicate that said switches do not conduct electric current and, in the case of transistors, have their control terminal (e.g., the gate terminal) biased in such a way as not to conduct electric current between the source and drain terminals. Further, reference will be made indifferently to switches "closed" or "ON" to indicate that said switches conduct electric current and, in the case of transistors, have their control terminal (e.g., the gate terminal) biased in such a way as to conduct electric current between the source and drain terminals.

In greater detail, the converter 10, comprises a main bridge 12, including a supply terminal 12a at a voltage $V_{IN}$ (with $V_{IN}$ ranging, for example, between 0.25 V and 5 V) and a reference terminal GND (connected to ground; however, other reference voltages may be used, for example $-V_{IN}$). The main bridge 12 further includes a high-side switch 13 and a low-side switch 14, connected together in series between the supply terminal 12a and the ground reference terminal GND. In particular, the high-side switch 13 is directly connected to the supply terminal 12a for receiving the signal $V_{IN}$ and the low-side switch 14 is directly connected to the ground reference terminal GND.

According to one embodiment, as shown in FIG. 2, the high-side switch 13 is a MOSFET, in particular an n-channel double-diffusion MOS (DMOS) transistor, with an ON-resistance ($R_{ON}$) of approximately 0.2Ω at 100 mA. The low-side switch 14 is of the same type as the transistor 13. Alternatively, in a way not shown, the high-side switch 13 and the low-side switch 14 may be produced using a different technology, for example they may be p-channel MOSFETs, or NPN or PNP bipolar transistors, IGBTs, or simply diodes.

Once again with reference to FIG. 2, a diode 15 and a diode 16 are connected between a respective source terminal S and a respective drain terminal D of the high-side switch 13 and of the low-side switch 14. The diodes 15 and 16 are connected in configuration known as "antiparallel" (with respect to the normal direction of flow of the current through the high-side switch 13 and the low-side switch 14). As is known, a characteristic of a MOSFET is that of presenting, in certain operating conditions, the electrical properties of a diode (parasitic diode). Said diode is electrically set (integrated) between the source and drain terminals of the MOSFET. In other words, the high-side switch 13 and the low-side switch 14 may present the electrical behavior of a diode, in which the cathode of the diode corresponds to the drain terminal and the anode to the source terminal of the respective high-side switch 13 and low-side switch 14 (vice versa, in the case of MOSFETs of a p type). In greater detail, the drain terminal D of the high-side switch 13 is connected to the supply terminal 12a, the source terminal S of the high-side switch 13 is connected to the drain terminal of the low-side switch 14 and the source terminal S of the low-side switch 14 is connected to the ground reference terminal GND. The high-side switch 13 and low-side switch 14 are driven in conduction by a respective first driving circuit (DC1) 25 and second driving circuit (DC2) 26, which are described more fully hereinafter. The driving circuits 25, 26 are connected to the control terminal G (or gate terminal) of the transistors that form the high-side switch 13 and the low-side switch 14, respectively.

The DC-DC converter 10 further comprises an inductor 18, having an inductance L for example comprised between approximately 1 μH and approximately 100 μH, in particular 10 μH. The inductor 18 includes a first conduction terminal 18a connected between the high-side switch 13 and the low-side switch 14 (in particular, connected to the source terminal S and drain terminal D of the high-side switch 13 and of the low-side switch 14, respectively) and a second terminal 18b, connected to the output bridge of the converter 10. The second terminal 18b is electrically coupled to the electrical load 20 by a coupling switch 22 and may be electrically connected to the reference terminal GND by a charge switch 23. Further, a diode 24 is connected in parallel to the coupling switch 22, with the anode coupled to the terminal 18b of the inductor 18 and the cathode coupled to the load 20. According to one embodiment, which in no way limits the scope of the present invention, the coupling switch 22 is a p-channel MOSFET. The diode 24 is the parasitic diode set (integrated) between the source and drain terminals of the MOSFET. In other words, when the coupling switch 22 is OFF, it assumes the electrical behavior of a diode, in which the cathode of the diode corresponds to the source terminal and the anode to the drain terminal of the coupling switch 22.

As is described more fully hereinafter, the coupling switch 22 has the function of enabling transfer of the energy stored in the inductor 18 towards the load 20 (coupling switch 22 ON, condition of load supplied and of the inductor current $I_L$ discharged on the output), or else of insulating electrically the load 20 from the inductor 18 (coupling switch 22 OFF, condition of load not supplied in an active way). The presence of the diode 24, with the cathode facing the load 20, does not allow transfer of energy from the electrical load 20 to the inductor 18 when the coupling switch 22 is OFF, but instead allows transfer of current in a passive way from the inductor 18 to the electrical load 20 when the coupling switch 22 is OFF and the diode 24 is appropriately biased.

The electrical load 20 may, for example, require a value of supply voltage $V_{OUT}$ comprised between 1 V and 5 V, or other values still, according to the application, for example sensors of various types, microcontrollers and communication systems.

In use, the energy required by the electrical load 20 for its operation is, as has been anticipated, supplied by the inductor 18, which, in turn, is charged and discharged by appropriately controlling the high-side switch 13 and the low-side switch 14 of the main bridge 12 and the switches 23 and 24 of the secondary output bridge. The high-side switch 13 and the low-side switch 14 are driven (opened/closed; turned on/turned off) in such a way as to prevent a direct connection between the terminal 12a at the supply voltage $V_{IN}$ and the ground reference terminal GND. Reference may be made for this purpose to FIGS. 9 to 10C, which are described hereinafter.

The converter 10 further comprises, in parallel to the charge switch 23, electrically coupled between the terminal 18b of the inductor 18 and the ground reference terminal GND, an anti-oscillation switch 58, operation of which is described more fully with reference to FIG. 3D.

According to one embodiment, both the charge switch 23 and the anti-oscillation switch 58 are transistors, for example n-channel MOSFETs.

FIGS. 3A-3D show respective operating steps of the converter 10 of FIG. 2 for implementing a method of control of the primary bridge and of the secondary bridge for charging and discharging the inductor 18 during each step of supply of the load 20.

For simplicity of representation, all the switches are represented using the graphic symbol of a generic switch and not as MOSFETs. For the same reason, also the respective diodes have been omitted, except for the diode 24.

FIGS. 4A-4D show time plots of the variation of the energy (in particular, the variation of the current $I_L$) in the inductor 18 during each of the operating steps of FIGS. 3A-3D, respectively.

Figure 4A:
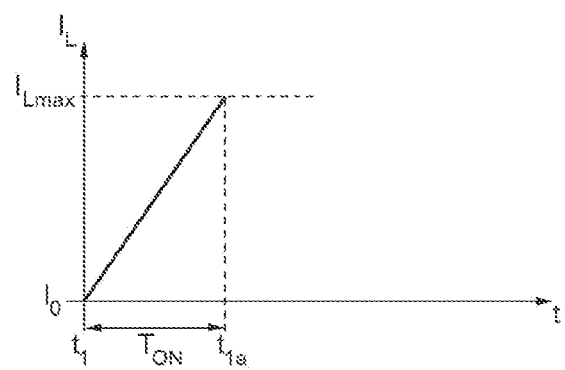
FIGS. 4A-4D show the evolution of the inductor current in the DC-DC converter of FIG. 2.

With reference to FIG. 3A, in this initial step the inductor 18 is in a discharged state and has to be charged. For this purpose, the high-side switch 13 of the main bridge 12 is closed, whereas the low-side switch 14 is open. Further, in this step, also the charge switch 23 is closed, thus coupling the terminal 18b of the inductor 18 to the ground reference terminal GND. The anti-oscillation switch 58 is, instead, open. With joint reference to FIGS. 3A and 4A, a current flows between the supply terminal 12a, biased at a voltage $V_{IN}$ and the ground reference terminal GND, through the inductor 18, which is thus energized (charged). Reference may be made to FIG. 4A, which shows a curve representing the evolution of the current $I_L$ stored in the inductor 18 during the step of FIG. 3A. The current $I_L$ increases, in a substantially linear way, starting from a minimum value $I_0$ (in particular the zero value, or a value close to zero) until it reaches a maximum value $I_{Lmax}$, in a time interval comprised between the instants $t_1$ and $t_{1a}$. The maximum value $I_{Lmax}$ is a predefined value, chosen on the basis of the characteristics of the inductor 18 used and on the basis of the electrical load to be supplied, for example 100 mA.

The step of FIG. 3A terminates when the energy stored in the inductor 18 reaches the predefined maximum value (current $I_L = I_{Lmax}$).

The next step is represented in FIG. 3B. With reference to this figure, the high-side switch 13 and the charge switch 23 are opened, whereas the low-side switch 14 is closed. Opening of the high-side switch 13 is preferably carried out prior to closing of the low-side switch 14. There is thus prevented direct connection of the supply terminal 12a to the ground reference voltage GND, thus avoiding phenomena of cross conduction between the terminal 12a and the ground reference terminal GND.

Then, once again with reference to FIG. 3B, the coupling switch 22 is closed, thus connecting the load 20 to the terminal 18b of the inductor 18. The terminal 18a of the inductor 18 is connected to the ground reference terminal GND via the low-side switch 14 and the energy stored in the inductor 18 flows towards the load 20, thus supplying it.

Figure 4B:
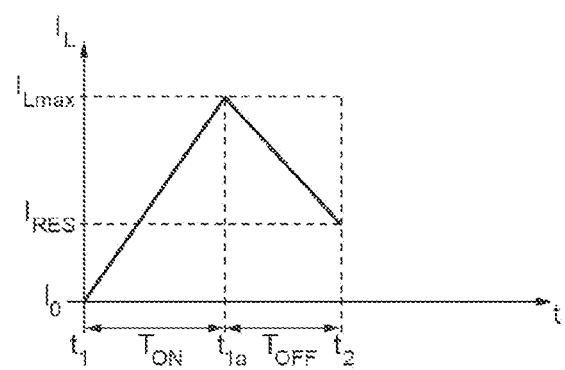

With reference to FIG. 4B, in this step of supply of the load, the current $I_L$ in the inductor 18 decreases until it reaches a predefined low value $I_{RES}$, at time $t_2$. The predefined low value $I_{RES}$ is not the zero value of the current $I_L$, but a value comprised, for example, between 5% and 20% of the peak value $I_{Lmax}$.

Figure 4C:
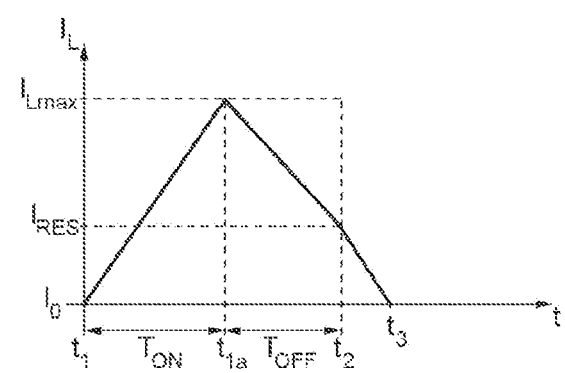

Then, FIG. 3C, the coupling switch 22 is opened and the low-side switch 14 is kept closed. The diode 24 continues to conduct electric current, in so far as, in this situation, it is forward biased. The residual current stored in the inductor 18 consequently continues to flow towards the load 20, through the diode 24 until it reaches the zero value. This condition is illustrated in FIG. 4C, which shows the decrease of the current $I_L$ from the value $I_{RES}$ to the value $I_0$ (zero current value), at time $t_3$. This step is a step of passive transfer of the energy towards the load 20.

During passive transfer of charge from the inductor 18 to the electrical load 20, the transistor that constitutes the coupling switch 22 is OFF and transfer of charge takes place via the diode integrated in the transistor 22 (in the figures, this is the diode designated by the reference number 24). Discharge of the inductor current is a function of the output supply voltage $V_{OUT}$ and of a difference of potential across the coupling switch 22, corresponding to the voltage $V_{BE}$ across the diode 24.

The next step is represented in FIG. 3D. Here, the anti-oscillation switch 58 (which up to now was open) is driven into a closed state, whereas the switch 23 is kept open. Both of the terminals 18a and 18b of the inductor 18 are thus coupled to the ground reference terminal GND. In this way, any spurious voltage oscillations on the terminals 18a and 18b, caused by residual energy possibly stored in the inductor 18 and in the parasitic capacitors associated to the terminals 18a and 18b, are prevented. In fact, any possible undesirable oscillations may cause problems of an electromagnetic nature, in addition to a possible reduction of the global efficiency of the converter 10.

Figure 4D:
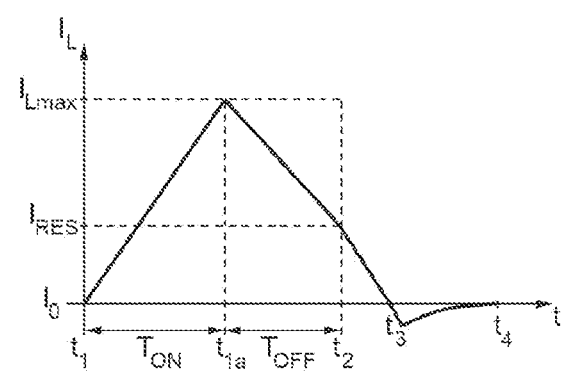

With reference to FIG. 4D, it may be noted that the current $I_L$ in the inductor 18 drops to negative values (i.e., in the inductor 18 a current flows from the terminal 18b to the terminal 18a) and settles, at time $t_4$, to the value $I_0$.

Then, the cycle of complete charge and discharge of the inductor 18 may restart, if necessary, for supplying the load 20 one again (i.e., the cycle returns to the step of FIGS. 3A, 4A).

The duration of the time interval $t_1$-$t_{1a}$, in what follows referred to as interval $T_{ON}$, is not predefined, but is calculated in an appropriate way so that, as the supply voltage $V_{IN}$ varies, the interval $T_{ON}$ will always enable charging of the inductor 18 to the desired maximum value $I_{Lmax}$. In other words, a voltage $V_{IN}$ of a high value will charge the inductor 18 in a short time interval $T_{ON}$; instead, a voltage $V_{IN}$ of a low value will charge the inductor 18 in a longer time interval $T_{ON}$.

With reference to FIG. 2, the function of definition of the appropriate interval $T_{ON}$ is performed by the first adaptive control block 51, electrically coupled to the supply terminal 12a for receiving the voltage $V_{IN}$ on the basis of which the length of the interval $T_{ON}$ is to be determined in an adaptive way.

Figure 5:
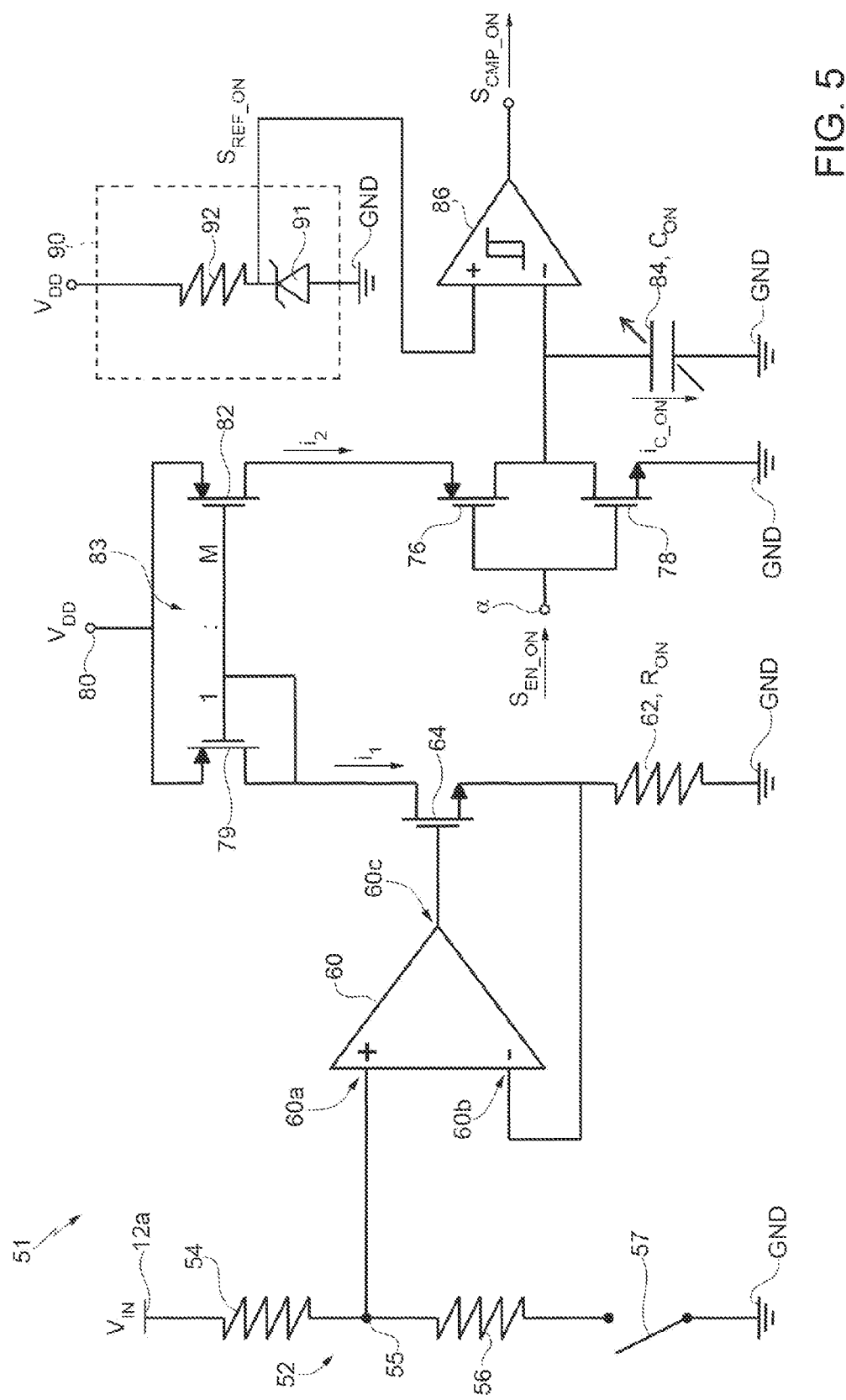

FIG. 5 shows, according to one embodiment, a circuit implementation of the first adaptive control block 51, for calculation of $T_{ON}$.

The first adaptive control block 51 comprises a branch 52 including a resistive voltage divider formed by a resistor 54 having a resistance R of 6 MΩ and by a resistor 56, connected in series to the first resistor 54, having a resistance equal to R/2, i.e., 3 MΩ. The resistors 54 and 56 are connected together in series. In particular, the resistor 54 has a first terminal coupled to $V_{IN}$ and a second terminal coupled to an intermediate node 55; the resistor 56 has a first terminal 56a coupled to the intermediate node 55 and a second terminal that may be coupled to the ground reference terminal GND. Electrical coupling and uncoupling of the second terminal of the resistor 56 to the ground reference terminal GND is managed by a switch 57 (e.g., a MOSFET), connected in series to the second resistor 56 between the second terminal and the ground reference terminal GND. The switch 57 is in a closed state during the operating steps of the adaptive control block 51 and is opened when the converter 10 is OFF or when the adaptive control block 51 is not functioning in order to prevent any undesirable dissipation of current. The switch 57 may, however, not be present.

An amplifier 60 includes a non-inverting input 60a electrically coupled to the intermediate node 55, configured to receive, in use, a voltage substantially equal to $V_{IN}/3$ (assuming, for simplicity, that the resistance introduced by the switch 58 is ideally substantially zero). The inverting terminal 60b of the amplifier 60 is connected to the ground reference terminal GND through a resistor 62 having a resistance $R_{ON}$=3 MΩ. The output terminal 60c of the amplifier 60 is configured to bias the gate terminal of a transistor, e.g. an n-channel MOSFET, 64. Further, the source terminal S of the transistor 64 is electrically coupled to the inverting terminal 60b and, via the resistor 62, to the ground reference terminal GND.

At the instant $t_1$ (see FIG. 4A), when it is desired to start charging of the inductor 18, the switch 57 is closed. In this way, the non-inverting terminal 60a is biased at a voltage equal to $V_{IN}/3$, as indicated previously. The output 60c of the amplifier 60 assumes a value such as to bias the gate of the transistor 64, which starts to conduct an electric current $i_1=V_{IN}/(3R_{ON})$. In practice, the stage formed by the amplifier 60, the transistor 64 and the resistor 62 forms a voltage-to-current converter.

The drain terminal of the transistor 64 is connected to a supply terminal 80 at a voltage $V_{DD}$ (e.g., comprised between approximately 2 V and approximately 5 V, for example approximately 3.5 V) via a transistor 79. The voltage $V_{DD}$ is, for example, supplied by a battery, not shown in the figure. The transistor 79 comprises a source terminal connected to the supply terminal 80 and a drain terminal and gate terminal connected together and to the drain terminal of the transistor 64. A further transistor 82 is connected in current-mirror configuration 83 with the transistor 79. In particular, the transistor 82 comprises a gate terminal connected to the gate terminal of the transistor 79 and a source terminal connected to the supply terminal 80. The current mirror 83 has a gain ratio 1:M and has the function of generating a current $i_2$, through the transistor 82, of a value $i_2=M \cdot i_1$. According to one embodiment, the value of M is chosen equal to 8 and is obtained by sizing appropriately the transistor 82, in a per se known manner.

The first adaptive control block 51, thus, converts the input voltage $V_{IN}$ into a current signal $i_2$ that is inversely proportional to the voltage $V_{IN}$.

The current signal $i_2$ is used for charging a capacitor 84 (current signal $i_{C\_ON}$).

As may be noted from FIG. 5, the drain terminal of the transistor 82 is connected to the ground reference terminal GND by a pair of transistors 76, 78. The transistor 76 is a p-channel MOSFET, whereas the transistor 78 is an n-channel MOSFET and, together, constitute a current-limited inverter.

The transistors 76, 78 have their respective gate terminals coupled to the same terminal α for receiving an enable signal $S_{EN\_ON}$. The enable signal $S_{EN\_ON}$ is a binary signal configured to assume two values: a "high" value configured to turn on the transistor 78 and, at the same time, to turn off the transistor 76; and a "low" value configured to turn off the transistor 78 and, at the same time, to turn on the transistor 76. In a way evident to a person skilled in the branch, the "high" and "low" values are chosen appropriately on the basis of the biasing characteristics of the transistors 76, 78 used and it is possible to envisage use of an appropriate buffer for adequately biasing the gates of the transistors 76 and 78.

In use, during the step of charging of the inductor 18 (FIGS. 3A, 4A) it is expedient to monitor the time interval $T_{ON}$ in order for the inductor 18 to be charged up to the required maximum value $I_{Lmax}$. For this purpose, at time $t_1$, the enable signal $S_{EN\_ON}$ assumes a low value for turning on the transistor 76 and turn off the transistor 78. The current $i_2$ thus flows from the supply terminal 80, through the transistors 82 and 76, to the capacitor 84, thus charging it with a current $i_{C\_ON}=i_2$.

The first adaptive control block 51 further comprises a comparator 86, configured to receive on its inverting terminal the value of voltage across the capacitor 84 and, on its non-inverting terminal, a reference signal $S_{REF\_ON}$ (voltage signal). Said reference value $S_{REF\_ON}$ is chosen in such a way that the time of charging of the capacitor 84, from a zero value to a value $S_{REF\_ON}$, is equal to the desired value for the interval $T_{ON}$. In this way, the time taken by the capacitor 84 to be charged up to the value $S_{REF\_ON}$ is the interval $T_{ON}$, which is inversely proportional to the input voltage $V_{IN}$. The interval $T_{ON}$ may thus be determined directly on the basis of the time taken by the capacitor 84 to reach the value $S_{REF\_ON}$ starting from a discharged condition of the capacitor 84.

According to one embodiment, the reference value $S_{REF\_ON}$, is equal to approximately 1 V. The signal $S_{REF\_ON}$ is, as has been said, a voltage reference signal and is generated in a per se known manner, for example by a reference-signal-generator block 90. The reference-signal-generator block 90 is connected between the supply terminal 80, for receiving the voltage $V_{DD}$ and the ground reference terminal GND. The supply voltage $V_{DD}$ is applied across a branch including a Zener diode 91 set in series with a resistor 92. In greater detail, the anode of the Zener diode 91 is connected to ground GND, the cathode of the Zener diode 91 is connected to a terminal of the resistor 92 and the other terminal of the resistor 92 is connected to the supply terminal 80. The reference signal $S_{REF\_ON}$ is taken at the cathode of the Zener diode 91. Operation of the reference-signal-generator block 90 is in itself evident. The Zener diode 91 operates as voltage limiter and the resistor 92 has the function of introducing a biasing current in the Zener diode 91. The value of the resistance 92 is to be calculated on the basis of the specific requirements, i.e., as a function of the effective value of the biasing current of the Zener diode 91. To obtain the effective value of resistance of the resistor 92 it is sufficient to use the formula $(V_{DD}-V_Z)/i_4$, where $V_{DD}$ is the supply voltage, $V_Z$ is the operating voltage of the Zener diode 91 and $i_4$ is the current of absorption of the block 90 (absorption of the Zener diode 91). The value of $V_Z$ defines, as is evident, the voltage value desired for reference signal $S_{REF\_ON}$ (a Zener diode 91 with an operating voltage equal to the value desired for the reference $S_{REF\_ON}$ will be used).

According to one embodiment, the capacitor 84 is a variable-capacitance capacitor. In this way, at the end of the steps of manufacture of the DC-DC converter 10, i.e., during a step of testing of the DC-DC converter 10, it is possible to set a desired value of capacitance of the capacitor 84, which may have undergone variations on account of process spread. According to one embodiment, the value of capacitance $C_{ON}$ of the capacitor 84 is chosen and set at 900 fF.

The comparator 86 is, in particular, a hysteretic comparator, configured to generate a hysteresis around the value set by the reference signal $S_{REF\_ON}$, for example a hysteresis interval of approximately 20 mV. This is useful in order to compensate for possible undesirable variations of the signals involved in the comparison step.

The comparator 86 is configured to generate at output a comparison signal $S_{CMP\_ON}$, configured to assume two values: a "low" value (logic value "0") at time $t_{1a}$ (which identifies the end of the interval $T_{ON}$); and a "high" value (logic value "1") otherwise.

In use, when the voltage across the capacitor 84 reaches the value set by the reference signal $S_{REF\_ON}$, the comparison signal $S_{CMP\_ON}$ changes state (e.g., passing from a high logic value to a low logic value), thus indicating that the current in the inductor has reached the maximum value $I_{Lmax}$. The next step is represented in FIGS. 3B, 4B. During this step (and during the subsequent steps) the capacitor 84 is discharged completely. For this purpose, the enable signal $S_{EN\_ON}$ assumes a "high" value, such as to turn off the transistor 76 and turn on the transistor 78. The capacitor 84 has, in this condition, both of the terminals coupled to the ground reference terminal GND and discharges. The comparison signal $S_{CMP\_ON}$ once again assumes the high logic value.

The comparison signal $S_{CMP\_ON}$ thus generated is used for determining the end of the interval $T_{ON}$ and consequently a falling edge thereof determines turning-off of the high-side switch 13. In this way, the duration of the interval $T_{ON}$ varies as a function of the value of the input voltage $V_{IN}$ in so far as the time of charging of the capacitor 84 is inversely proportional to the value of the input voltage $V_{IN}$. Consequently, once the value $S_{REF\_ON}$ is appropriately fixed, the peak current $I_{Lmax}$ stored in the inductor 18 assumes a value that is always constant, even as $V_{IN}$ varies. The time interval $T_{ON}$ during which the inductor 18 is being charged assumes, instead, a value variable according to the value of input voltage $V_{IN}$ (which is inversely proportional to $V_{IN}$) or, rather, according to the value assumed by the current signal $i_2$, which is proportional to the current signal $i_1$ generated starting from the voltage value $V_{IN}$.

In greater detail, it is found that the value of current $i_{C\_ON}=i_2$ is equal to $(M \cdot V_{IN})/(3R_{ON})$, where $R_{ON}$ is the resistance of the resistor 62 and M is the value of current gain of the current mirror 83 (e.g., M=8). Consequently, we have that the value of the interval $T_{ON}$ is equal to $(3R_{ON} \cdot C_{ON} \cdot S_{REF\_ON})/(M \cdot V_{IN})$, where $C_{ON}$ is the value of capacitance of the capacitor 84.

The value $I_{Lmax}$ is given by $(T_{ON} \cdot V_{IN})/L$, where L is the value of inductance of the inductor 18. It follows that the predefined maximum value $I_{Lmax}$ for the current $I_L$ stored in the inductor 18 is irrespective of the value of the input voltage $V_{IN}$ and is given by $$I_{Lmax} = (3R_{ON} \cdot C_{ON} \cdot S_{REF\_ON})/(M \cdot L)$$

To return to FIG. 2, the converter 10 further comprises a second adaptive control block 101, configured to generate a discharge time interval $T_{OFF}$ during which the step described with reference to FIGS. 3B and 4B is carried out. During the discharge time interval $T_{OFF}$ the charge stored in the inductor 18 flows to the load 20, thus supplying it. As has been said, this step of discharge (active discharge) occurs between the time $t_{1a}$ and the time $t_2$ by driving the coupling switch 22 in conduction (transistor ON); a subsequent step of passive discharge occurs by opening the switch 22 (transistor OFF) and causing flow of the residual charge through the diode 24. The discharge time interval $T_{OFF}$ is an interval during which there is a process of active discharge of the inductor 18 (i.e., using active elements, namely, the transistor that constitutes the switch 22). During the step of active discharge, the output supply signal $V_{OUT}$ is applied also to the node 18b of the inductor, since the coupling switch 22 is ON.

Figure 6:
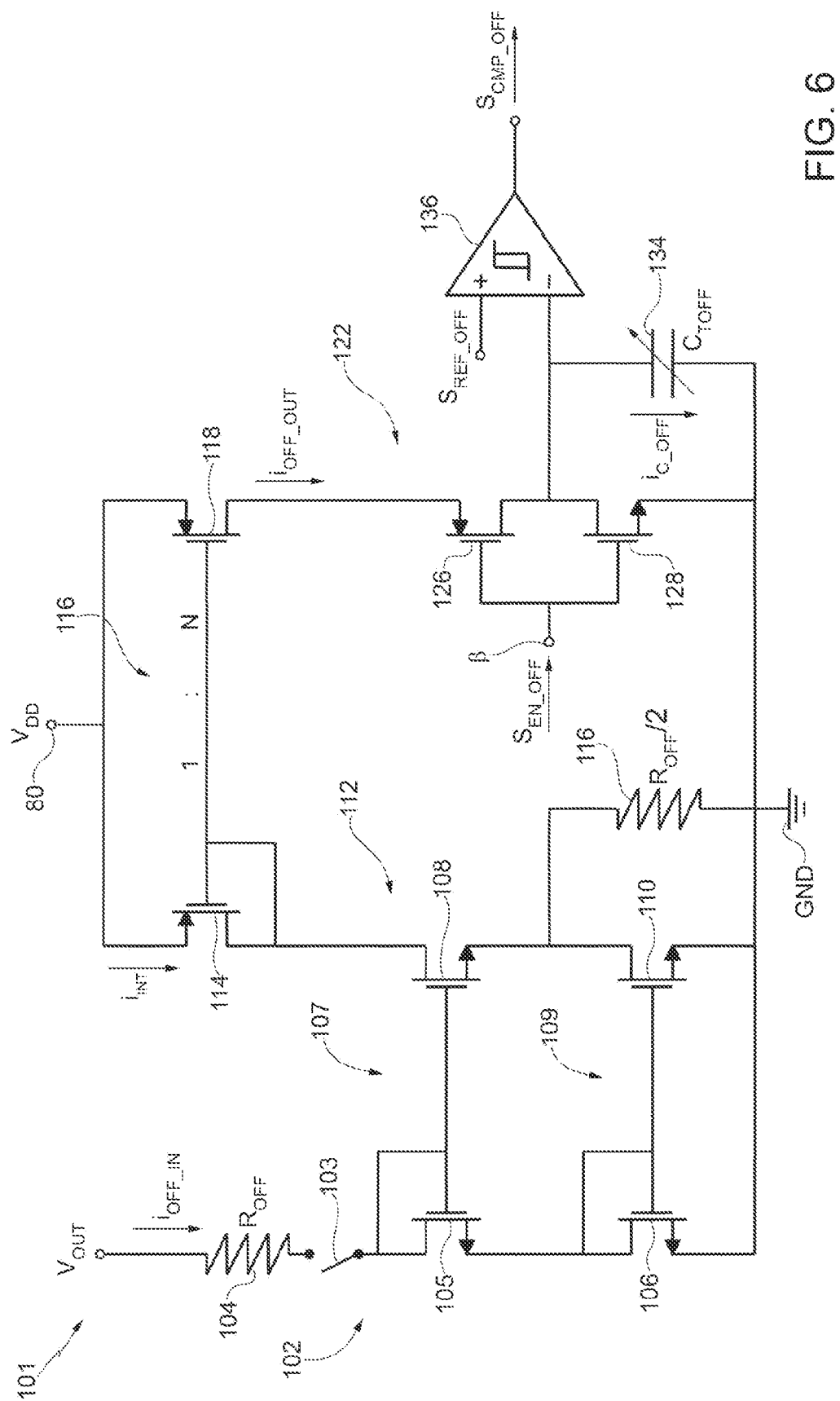

With reference to FIG. 6, the second adaptive control block 101 comprises an input branch 102 connected between the load 20 and the ground reference terminal GND. The input branch 102 comprises, connected in series together, a resistor 104, having a resistance $R_{OFF}$, for example equal to 9 MΩ, a transistor 105, of an n-channel type and a transistor 106, of an re-channel type.

The resistor 104 has one conduction terminal coupled to the supply voltage for supply of the load 20 and the other conduction terminal coupled to the drain terminal of the transistor 105. In turn, the transistor 105 has its source terminal coupled to the drain terminal of the transistor 106 and the latter has its source terminal electrically coupled to the ground reference terminal GND.

According to the embodiment shown in FIG. 6, a switch 103 is set in series to the resistor 104, between the resistor 104 and the transistor 105. During operation of the second adaptive control block 101, this switch 103 is in a closed state (i.e., it conducts current). When the second adaptive control block 101 is not used, or when the converter 10 is OFF, the switch 103 is open (i.e., it does not conduct). The switch 10 is optional and is configured to guarantee selective electrical insulation of the second adaptive control block 101 in order to prevent undesirable consumption of current when the converter 10 is OFF or when the second adaptive control block 101 is not used.

In greater detail, the transistor 105 forms, together with a further transistor 108, a current mirror 107. Also the transistor 106 forms, together with a further transistor 110, a respective current mirror 109. For this purpose, the gate terminal of the transistor 105 is electrically connected to the gate terminal of the transistor 108; further, the drain terminal of the transistor 105 is electrically connected to the gate terminals of the transistors 105 and 108. Likewise, the gate terminal of the transistor 106 is electrically connected to the gate terminal of the transistor 110; further, the drain terminal of the transistor 106 is electrically connected to the gate terminals of the transistors 106 and 110.

The transistors 108 and 110 are connected together in series on an intermediate branch 112 of the adaptive control block 101. The intermediate branch 112 further comprises a p-channel transistor 114 connected between the drain terminal of the transistor 108 and a supply terminal (the latter, in particular, coinciding with the supply terminal 80 shown in FIG. 5 and being supplied by the voltage $V_{DD}$ itself). In greater detail, the source terminal of the transistor 114 is connected to the voltage $V_{DD}$, the drain terminal of the transistor 114 is connected to the drain terminal of the transistor 108, the source terminal of the transistor 108 is connected to the drain terminal of the transistor 110 and the source terminal of the transistor 110 is connected to the ground reference terminal GND. Further connected between the drain terminal of the transistor 110 and the ground reference terminal GND (i.e., in parallel to the transistor 110) is a resistor 116, which has, for example, a value of resistance equal to $R_{OFF}/2$.

In use, when an output voltage $V_{OUT}$ is present on the terminal 18b, we have that a current $i_{OFF\_IN}$ flows on the input branch 102, through the resistor 104 and the transistors 105, 106. The voltage drop on the resistor 104 is thus equal to $V_{OUT} - 2V_{GS}$, where $V_{GS}$ is the voltage drop between gate and source terminals of each of the transistors 105 and 106, which are assumed as being the same as one another. The current $t_{OFF\_IN}$ is thus given by $$i_{OFF\_IN} = (V_{OUT} - 2V_{GS})/R_{OFF}$$

On the basis of operation of the current mirrors 107 and 109 we have that the current $i_{INT}$ that flows in the intermediate branch 112 is equal to $i_{OFF\_IN} + 2V_{GS}/R_{OFF}$, where, also in this case, $V_{GS}$ is the voltage drop between the gate and source terminals of the transistor 110, which is assumed as being the same as the transistors 105 and 106 and thus as having the same voltage $V_{GS}$. As a result of operation of the current mirrors 107 and 109 and of the presence of the resistor 116 with resistance $R_{OFF}/2$, we thus have: $i_{INT} = V_{OUT}/R_{OFF}$; namely, the current that flows in the intermediate branch 112 is irrespective of the voltages $V_{GS}$ of the transistors belonging to the current mirrors 107 and 109 (which are assumed as being the same as one another).

The second adaptive control block 101 further comprises an additional current mirror 116, formed by the transistor 114 (belonging to the intermediate branch 112) and by a transistor 118, of a p-channel type, which belongs to an output branch 122.

The transistors 114 and 118 have their respective source terminals connected to the supply terminal 80 and respective gate terminals connected together and to the drain terminal of the transistor 114. The current mirror 116 has a gain ratio 1:N and has the function of generating a current $i_{OFF\_OUT}$ of a value $N \cdot i_{INT}$. According to one embodiment of the present invention, the value of N is chosen equal to 10 and is obtained by appropriately sizing the transistor 118 in a per se known manner.

The output branch 122 further comprises a pair of transistors 126, 128. The transistor 126 is a p-channel MOSFET, whereas the transistor 128 is an n-channel MOSFET and, together, provide a current-limited inverter.

The transistors 126, 128 have their respective gate terminals coupled to the same terminal β for receiving an enable signal $S_{EN\_OFF}$. The enable signal $S_{EN\_OFF}$ is a signal configured to assume two values: a "high" value configured to turn on the transistor 128 and, at the same time, to turn off the transistor 126; and a "low" value configured to turn off the transistor 128 and, at the same time, to turn on the transistor 126. In a way evident for the person skilled in the branch, the "high" and "low" values are chosen appropriately on the basis of the biasing characteristics of the transistors 126, 128 used.

In use, during the step of active discharge of the inductor 18 (FIGS. 3B, 4B) it is expedient to manage the time interval $T_{OFF}$ so that the inductor 18 will be discharged to the intermediate value $I_{RES}$ envisaged. For this purpose, at time $t_{1a}$, the enable signal $S_{EN\_OFF}$ assumes a low logic value, thus turning on the transistor 126 and turning off the transistor 128. The current $i_{OFF\_OUT}$ thus flows from the supply terminal 80, through the transistors 118 and 126, to the capacitor 134, charging it with a current $i_{C\_OFF} = i_{OFF\_OUT}$.

The second adaptive control block 101 further comprises a comparator 136, which is configured to receive on the inverting terminal the value of voltage across the capacitor 134 and, on the non-inverting terminal, a reference signal $S_{REF\_OFF}$ (voltage signal) configured to set a maximum voltage value that the voltage across the capacitor 134 may assume. Said reference value $S_{REF\_OFF}$ is chosen in such a way that the time of charging of the capacitor 134 from the value that it assumes when it is discharged to the reference value $S_{REF\_OFF}$ is equal to the value desired for the interval $T_{OFF}$. In this way, the time taken by the capacitor 134 to charge up to the reference value $S_{REF\_OFF}$ corresponds to the interval $T_{OFF}$.

According to one embodiment, the reference value $S_{REF\_OFF}$, is approximately 1 V. The signal $S_{REF\_OFF}$ is, as has been said, a voltage reference signal and is generated in a per se known manner, for example by a reference-signal-generator block similar to the reference-signal-generator block 90 of FIG. 5 and thus not described any further.

The capacitor 134 is, according to one embodiment, a variable-capacitance capacitor. In this way, at the end of the steps of manufacture of the DC-DC converter 10, i.e., during a step of testing of the DC-DC converter 10, it is possible to set a desired value of capacitance of the capacitor 134, which may have undergone variations on account of process spread. According to one embodiment, the value of capacitance $C_{OFF}$ of the capacitor 134 is chosen and set at 900 fF.

The comparator 136 is, in particular, a hysteretic comparator, configured to generate a hysteresis around the reference value $S_{REF\_OFF}$, for example a hysteresis interval of approximately 10 mV. This is useful in order to compensate for possible undesirable variations of the signals involved in the comparison step.

The comparator 136 is configured to generate at output a comparison signal $S_{CMP\_OFF}$, configured to assume two values: a "low" value (logic value "0") at time $t_2$ (i.e., the time that indicates the end of the interval $T_{OFF}$); and a "high" value (logic value "1") otherwise.

In use, when the voltage across the capacitor 134 reaches the reference value $S_{REF\_OFF}$, the comparison signal $S_{CMP\_OFF}$ changes state (e.g., passing from the high logic value to the low logic value), thus indicating that the current in the inductor has reached the intermediate value $I_{RES}$. The next step is represented in FIGS. 3C, 4C. During this step (and during the subsequent steps) the capacitor 134 is discharged completely. For this purpose, the enable signal $S_{EN\_OFF}$ assumes a "high" value, such as to turn off the transistor 126 and turn on the transistor 128. The capacitor 134 has, in this condition, both of the terminals coupled to the ground reference terminal GND and discharges.

The coupling switch 22 is kept in the ON state only between $t_{1a}$ and $t_2$ and is OFF when the comparison signal $S_{CMP\_OFF}$ assumes a low value. In this way, the intermediate value $I_{RES}$ of the current that supplies the load 20 through the inductor 18 assumes a constant value even as the supply voltage of the load 20 varies, i.e., as $T_{OFF}$ varies. The time interval $T_{OFF}$ during which the inductor 18 is discharged assumes in fact a value that varies according to the value of output voltage $V_{OUT}$.

In greater detail, it is found that the value of current $i_{C\_OFF}=i_{OFF\_OUT}$ is equal to $N \cdot V_{OUT}/(R_{OFF})$, where, it is recalled, N is the value of current gain of the current mirror 116 (for example, if N=10 then $i_{C\_OFF}=10V_{OUT}/R_{OFF}$). Consequently, we have that the value of the interval $T_{OFF}$ is equal to $(R_{OFF} \cdot C_{OFF} \cdot S_{REF\_OFF})/(N \cdot V_{OUT})$, where $C_{OFF}$ is the value of capacitance of the capacitor 134.

The variation of current $\Delta I$ between the maximum value $I_{Lmax}$ and the intermediate value $I_{RES}$ (i.e., $\Delta I = I_{Lmax} - I_{RES}$) is given by $(T_{OFF} \cdot V_{OUT})/L$, where L is the inductance of the inductor 18. From this it follows that the value of intermediate current $I_{RES}$ is given by $I_{Lmax} - \Delta I$:

$$I_{RES} = (3R_{ON} \cdot C_{ON} \cdot S_{REF\_ON})/(M \cdot L) - (R_{OFF} \cdot C_{OFF} \cdot S_{REF\_OFF})/(N \cdot L)$$

To return to FIG. 2, the converter 10 further comprises a first voltage comparator (VC1) 140 electrically coupled between the inductor 18 and the coupling switch 22 (i.e., electrically connected to the terminal 18b of the inductor 18).

The first voltage comparator 140 is shown in greater detail in FIG. 7 and comprises a first input terminal, which is connected between the terminal 18b of the inductor 18 and the anode of the diode 24, a second input terminal, which is connected to the cathode of the diode 24 and receives the output voltage $V_{OUT}$, a third input terminal, which is coupled to the ground reference terminal GND and an output terminal, which is configured to supply a control signal $S_{CTR\_PT}$ that identifies whether the step of passive transfer (i.e., transfer obtained by passive components, such as the diode 24) of energy to the load 20 has terminated or is in progress (step of FIGS. 3C, 4C). The first voltage comparator 140 comprises a current-limited inverter 142 formed by a transistor 144, in particular a MOSFET of a p-channel type and by a transistor 146, in particular a MOSFET of an n-channel type. The transistor 144 and the transistor 146 have their respective drain terminals connected together and their respective gate terminals connected to the terminal 18b of the inductor 18. Further, the source terminal of the transistor 146 is coupled to the ground reference GND, whereas the source terminal of the transistor 144 is coupled to the cathode of the diode 24 for receiving the output voltage $V_{OUT}$. The first voltage comparator 140 further comprises a buffer 148, having an input coupled to the drain terminals of the transistors 144 and 146 and an output configured to supply the control signal $S_{CTR\_PT}$. The buffer 148 has the function of rectifier, for generating at output a signal that is correlated to the signal that it receives at input but has faster rising and falling edges. The buffer 148 is configured to receive at input a signal varying in the range $0-V_{OUT}$ and generate at output a signal having a low logic value "0" if the input is below a predefined threshold, for example equal to $V_{OUT}/2$, or else a high logic value "1" if the input is above the predefined threshold, or vice versa. Preferably, the buffer 148 has a threshold with hysteresis.

The presence of the current generator 149, between the inverter 142 and the second input terminal at voltage $V_{OUT}$, represents a current limitation, for example obtained using a current mirror with p-channel transistors, for limiting the current through the inverter 142 to a value of 100 nA.

In use, during the steps of active transfer (FIGS. 3B, 4B) and passive transfer (FIGS. 3C, 4C), the signal present on the gate terminal of the transistors 144 and 146 is such as to drive the transistor 144 into the OFF state and the transistor 146 into the ON state.

In use, when the coupling switch 22 is OFF and transfer of energy to the load 20 occurs only via the diode 24, the inductor current $I_L$ drops to the zero value. Also the voltage $V_{BE}$ across the diode 24 drops until it reaches to the zero value. We thus have a zero voltage drop on the diode 24 and the terminal 18b is found at an output voltage $V_{OUT}$. Supply of the load 20 is thus concluded. However, the inductor current $I_L$ continues to drop (i.e., an inverse current is present in the inductor 18) as a result of the parasitic capacitances that couple the terminal 18b of the inductor to the ground reference terminal GND (there should here be considered, in general, all the parasitic capacitances present and deriving from the manufacturing steps, for example from production of the transistors that provide the switches 23 and 58). The drop in voltage on the terminal 18b causes turning-off of the transistor 146 and turning-on of the transistor 144. Consequently, the control signal $S_{CTR\_PT}$ changes its logic state, going from the low logic value "0" to the high logic value "1". The control signal $S_{CTR\_PT}$="1" identifies the end of the step of FIGS. 3C and 4C and determines passage to the next step of FIGS. 3D and 4D.

Passage from the step of passive supply of the load 20 to the step of stabilization of the inductor current IL is obtained by closing the anti-oscillation switch 58. The converter 10 remains in the step of FIG. 3D until the inductor current IL settles to the zero value (i.e., to the reference voltage value GND). FIG. 8 shows a circuit implementation of a second voltage comparator (VC2) 150 configured to monitor, during the step of FIG. 3D, the voltage on the node 18b, which is proportional to the inductor current IL. For this purpose, the second voltage comparator 150 is electrically coupled between the terminal 18b of the inductor 18 and the anode of the diode 24, to the ground reference terminal GND and to the supply voltage VDD (supply terminal 80). The second voltage comparator 150 comprises a current mirror 151. The current mirror 151 includes a transistor 152, of an n-channel type, coupled between the terminal 80 at the supply voltage VDD and the ground reference terminal GND and a transistor 153, of an n-channel type, coupled between the terminal 80 at the supply voltage VDD and the terminal 18b of the inductor 18. The current generators 154, 155, set between the transistor 152 and the supply terminal 80 and, respectively, between the transistor 153 and the supply terminal 80, represent schematically a current limitation and are, for example, implemented by a pair of current mirrors with p-channel transistors, for limiting the current that flows in the respective branches to a value of some hundreds of nanoamps. The second voltage comparator 150 further comprises a buffer 158, having the function of rectifier, electrically coupled to the drain terminal of the transistor 153, for collecting the signal that flows in the branch that includes the generator 155 and the transistor 153 and for generating at output a control signal SCTR_AR that is correlated to the signal that it receives at input but has faster rising and falling edges. The buffer 158 is thus configured to receive at input a signal that varies in the range 0-VDD and generating at output a signal having a low logic value "0" if the input is below a predefined threshold (said threshold is equal to VDD/2), or else a high logic value "1" if the input is above the predefined threshold. Preferably, the buffer 158 has a threshold with hysteresis.

According to one embodiment, the current mirror 151 may have a mirror ratio 10:2 in order to speed up the state transitions of the signal set at input to the buffer 158. However, a current mirror 151 with a different ratio, for example 1:1, may be used.

In use, when the anti-oscillation switch 58 is ON, an inverse current $-I_L$ flows in the inductor 18 (from the terminal 18b to the terminal 18a), generating a negative voltage on the terminal 18b, equal to $-I_L \cdot R_{AR}$, where $R_{AR}$ is the ON-resistance of the anti-oscillation switch 58. The output of the buffer 158 assumes a low logic value "0" as long as a negative voltage remains on the terminal 18b and then goes to a high logic value "1" when the voltage on the terminal 18b reaches the predefined threshold value.

Figure 9:
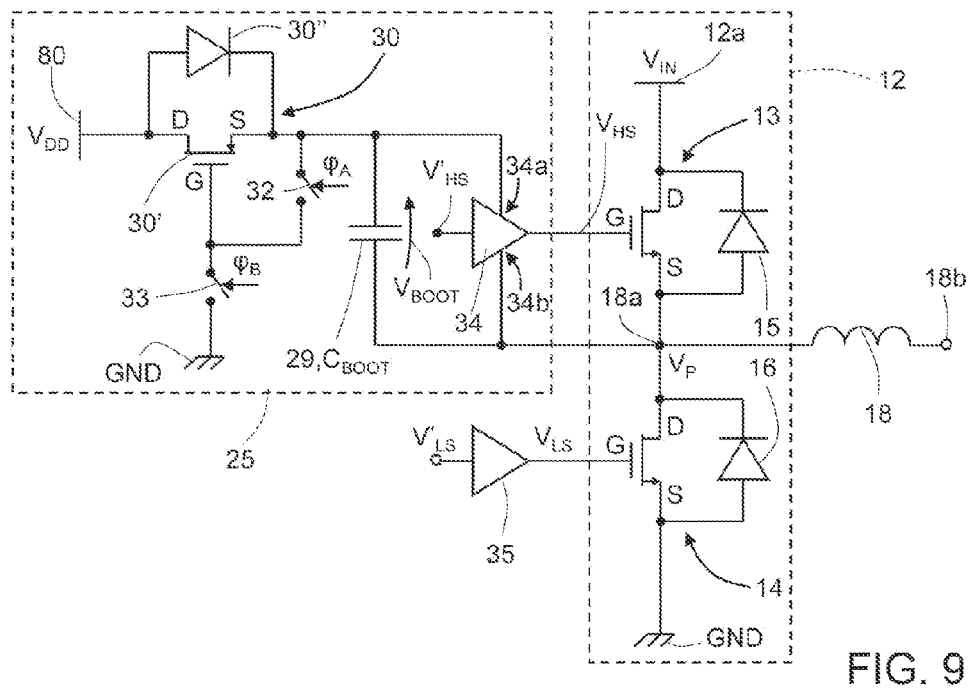
FIG. 9 shows a circuit for driving the converter of FIG. 2 used during the steps of FIGS. 3A-3D.

FIG. 9 shows the first and second driving circuits 25, 26 connected to the main bridge 12, according to one embodiment of the present invention.

With reference to the high-side switch 13, the first driving circuit 25 coupled thereto is configured to drive the high-side switch 13 alternatively into an open state, in which the high-side switch 13 does not conduct current and into a closed state, in which the high-side switch 13 conducts current. With reference to a high-side switch 13 of a n-channel MOSFET type, the first driving circuit 25 is configured to appropriately bias the gate terminal G of the high-side switch 13 in such a way that, when it is necessary to close the high-side switch 13, the voltage between the source terminal S and the gate terminal G will be higher than the threshold voltage of turning-on of the high-side switch 13. For this purpose, the first driving circuit 25 comprises a bootstrap circuit. In detail, the first driving circuit 25 is coupled to: the supply terminal 80, at a voltage $V_{DD}$; a recharge switch 30 (in particular, FIG. 9 shows a MOSFET 30', of a p type, with integrated diode 30" having the drain terminal D connected to the supply terminal 80); and a capacitor 29, having a capacitance $C_{BOOT}$ comprised between approximately 200 pF and approximately 700 pF, for example approximately 400 pF, connected between the source terminal S of the recharge switch 30 and the terminal 18a of the inductor 18.

The recharge switch 30 is configured to couple the capacitor 29 to the supply terminal 80 for charging the capacitor 29 by the voltage $V_{DD}$ and, alternatively, to uncouple the capacitor 29 from the supply terminal 80. The first driving circuit 25 further comprises additional switches 32 and 33. The switch 32 is connected between the source terminal S and the gate terminal G of the recharge switch 30, whereas the switch 33 is connected between the gate terminal G of the recharge switch 30 and the ground reference terminal GND.

The switches 32 and 33 are, for example, MOSFETs driven in conduction and inhibition by a respective control signal $\varphi_A$ and $\varphi_B$, applied to the gate terminal of the respective switch 32, 33. The control signals $\varphi_A$ and $\varphi_{dB}$ are generated by a logic external to the first driving circuit 25 for implementing proper operation of the circuit 25 during the steps described with reference to FIGS. 3A-3D and 4A-4D.

The high-side switch 13 and the low-side switch 14 have their gate terminals G connected to a respective driving device 34, 35. For example, the first and second driving devices 34, 35 are each formed by a chain of "m" inverters, where "m" is an even number.

With reference to the driving device 34, the latter comprises a first supply input 34a and a second supply input 34b, which are connected to a floating supply, between $V_P$ and $V_{BOOT}$ (where $V_P$ is the voltage on the terminal 18a of the inductor 18), for generating at output a signal $V_{HS}$ configured to drive (open/close) the high-side transistor 13 on the basis of a signal $V_{HS}'$ that it receives at input. Since the driving device 34 is supplied at a voltage comprised between $V_P$ and $V_{BOOT}$, in use it is able to generate a driving voltage on the gate terminal of the high-side switch 13 higher than the voltage $V_P$ applied to the source terminal S (in particular higher than the threshold voltage of turning-on of the high-side switch 13); see, for example, in FIG. 10C, the voltage $V_X$.

With reference to the driving device 35, the latter receives at input a signal $V_{LS}'$ (which is also generated by the control logic) and generates at output a signal $V_{LS}$ configured to drive (open/close) the low-side transistor 14. Since the low-side transistor 14 has its source terminal S connected to the ground reference GND, it is not necessary to provide a supply circuit similar to the one described with reference to the driving device 34 that will guarantee voltages on the gate terminal G that vary as a function of the voltage assumed by the source terminal S.

Figure 10A:
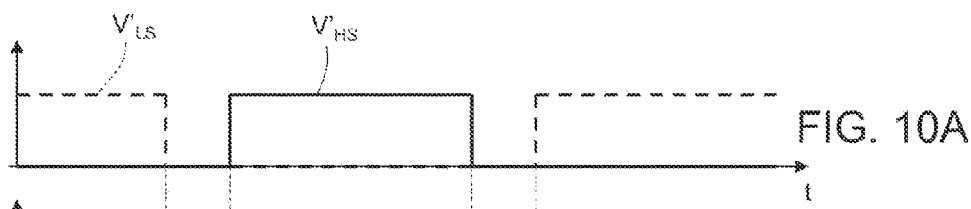
FIGS. 10A-10C show driving signals used during operation of the driving circuit of FIG. 9.
Figure 10B:
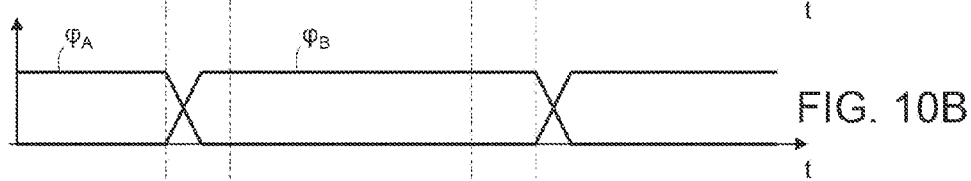
Figure 10C:
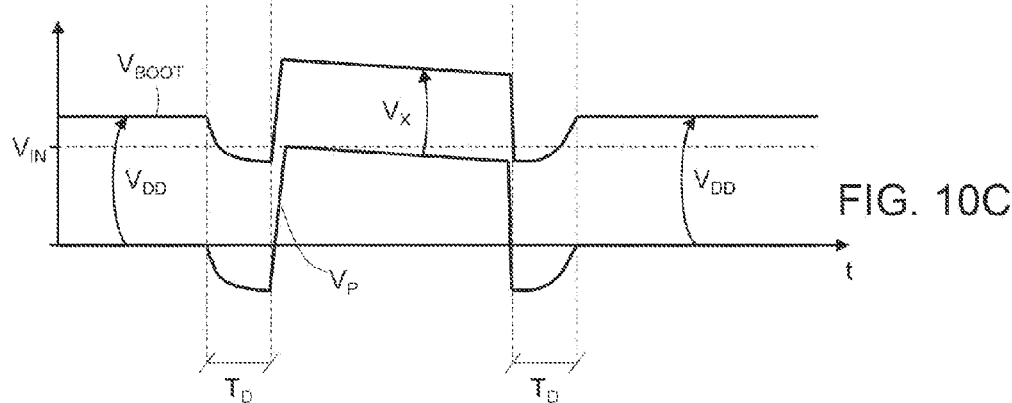

FIG. 10A shows, as a function of time t (axis of the abscissae), the timing diagram of the signals $V_{HS}'$ and $V_{LS}'$ applied, respectively, to the driving device 34 and 35. FIG. 10B shows, using the same time scale as that of FIG. 10A, the timing diagram of the control signals $\varphi_A$ and $\varphi_B$, which are configured to drive in opening and closing the switches 32 and 33 of FIG. 9. FIG. 10C shows, using the same scale time as that of FIGS. 10A and 10B, the plot of the voltage signal $V_{BOOT}$ and of the voltage signal V.

When the low-side switch 14 is closed (signal $V_{LS}'$ high), the terminal 18a is connected to the ground reference voltage GND and the signal $V_P$ is thus at the ground reference voltage GND (e.g., approximately 0 V).

During this time interval the capacitor 29 is charged by the voltage $V_{DD}$. This is made possible by connecting the capacitor 29 to the supply terminal 25a by closing the switch 30 (the switch 33 is closed and the switch 32 is open). As has already been said, during the time interval in which the low-side switch 14 is closed, the inductor 18 is connected to ground GND and a discharge current flows through the low-side switch 14.

When it is necessary the recharge the inductor 18, the switch 30 is opened (by opening the switch 33 and closing the switch 32). Preferably, the low-side switch 14 is opened prior to closing of the high-side switch 13 in order to prevent phenomena of cross conduction. The capacitor 29, which had previously been charged, maintains the charge stored and supplies the driving device 34, which, in turn, biases the control terminal of the high-side switch 13, driving it into conduction. The supply terminal 12a is thus connected to the terminal 18a of the inductor 18, enabling supply of the electrical load as explained previously.

From FIGS. 10A and 10B it may be noted that the signal $V_{LS}'$ is at a high value when the control signal $\varphi_A$ is at a high value (switch 32 open) and the signal $V_{HS}'$ is at a low value. During this interval, the capacitor 29 is recharged. When the signal $V_{LS}'$ drops, also the control signal $\varphi_A$ drops (closing the switch 32). At the same time, the control signal $\varphi_B$ rises (opening the switch 33). After a certain time interval, also the signal $V_{HS}'$ rises. Between the falling edge of the signal $V_{LS}'$ and the rising edge of the signal $V_{HS}'$ a dead time is in fact envisaged to prevent phenomena of cross conduction.

With closing of the high-side switch 13 the voltage $V_P$ rises to the value $V_{IN}$.

In this step, in which the switch 33 is open and the switch 32 is closed, the capacitor 29 is in a charged condition ($V_{BOOT} \approx V_{DD}$). With turning-on of the high-side switch 13, the node at $V_P$ rises in voltage and, as a result of the (capacitive) bootstrap, also the voltage on the opposite plate of the capacitor 29 (bootstrap capacitor) rises. The voltage $V_X$ across the capacitor 29 is kept substantially constant (but for minor losses). In this way, during the step of turning-on of the high-side switch 13, the driving device 34 is supplied and is thus able to turn on the high-side switch 13.

The voltage drop $V_X$ across the capacitor 29 when the high-side switch 13 is closed is given by $$V_X = V_{DD}\left(1 - \frac{C_{GS}}{C_{BOOT} + C_{GS}}\right)$$

where $C_{GS}$ is the capacitance between the gate terminal and the source terminal of the high-side transistor 13.

The embodiment of FIG. 9 enables minimization of the area required for the ensemble formed by the high-side switch 13 and the first driving circuit 25, maintaining good characteristics of performance as regards the ON-resistance ($R_{ON}$) and enabling a complete integration of the first driving circuit 25 and of the high-side switch 13 without the need to use external components.

To return to FIG. 2, the converter 10 further comprises, according to one embodiment, a hysteretic comparator 87 (of a per se known type, in which the hysteresis is defined between a first threshold $V_{th}^-$ and a second threshold $V_{th}^+$, with $V_{th}^- < V_{th}^+$). The hysteretic comparator 87 comprises an inverting input configured to receive the output signal $V_{OUT}$ and a non-inverting input configured to receive a reference signal $V_{ref\_c}$.

The reference signal $V_{ref\_c}$ is a bandgap reference, independent of the supply voltage and of the temperature.

The output of the hysteretic comparator 87 indicates the level of voltage assumed by the output signal $V_{OUT}$. The signal $V_{comp}$ generated at output by the hysteretic comparator 87 is used during the steps of supply of the electrical load 20 for detecting whether the electrical load 20 needs to be supplied or not. The electrical load 20, in fact, is supplied (recharged) only when necessary, i.e., when the output voltage signal $V_{OUT}$ drops below the threshold defined by the reference signal $V_{ref\_c}$.

The hysteretic comparator 87 has two possible output logic levels, in particular the ground reference value GND (or equivalent) and the value of the supply signal ($V_{DD}$). When the output signal $V_{comp}$ of the hysteretic comparator 87 is equal to $V_{DD}$, then the output voltage $V_{OUT}$ has dropped below the reference $V_{ref\_c}$ and the respective electrical load 20 must be supplied. When the output signal $V_{comp}$ of the hysteretic comparator 87 is equal to the ground reference GND, then the output voltage $V_{OUT}$ is higher than the reference $V_{ref\_c}$ and the electrical load 20 does not have be supplied. The characteristic of the comparator 87 is centered around the reference $V_{ref\_c}$ and is the classic hysteretic characteristic (indicatively with thresholds $V_{th}^+ > V_{ref\_c}$ and $V_{th}^- < V_{ref\_c}$).

In order to decide whether the electrical load 20 needs to be supplied, the output signal $V_{OUT}$ is monitored in a continuous way or at regular intervals. If the output signal $V_{OUT}$ drops below the threshold $V_{th}^-$ of the hysteretic comparator 87, the electrical load 20 is supplied and charged. The charging step is not carried out if the output signal $V_{OUT}$ exceeds the threshold $V_{th}^+$. Each comparator 87 is configured to have the hysteresis equal to the maximum value of ripple tolerated by the specific application, for example approximately 10-50 mV.

In order to manage the operating steps of the converter 10, i.e., the steps described with reference to FIGS. 3A-3D and 4A-4D, for passage from one step to the next and for verifying whether the electrical load 20 needs to be supplied or not, the converter 10 further comprises a control logic 85, for example an integrated digital controller, as shown schematically in FIG. 11. The control logic 85 carries out generation of the signals to turn-on/turn-off the high-side switch 13 and the low-side switch 14 and generation of the control signals of the switches 57 (FIG. 5) and 103 (FIG. 6), of the anti-oscillation switch 58, of the switch 23 and of the enable signals $S_{EN\_ON}$ and $S_{EN\_OFF}$ in order to implement the operating steps described previously.

Figure 12:
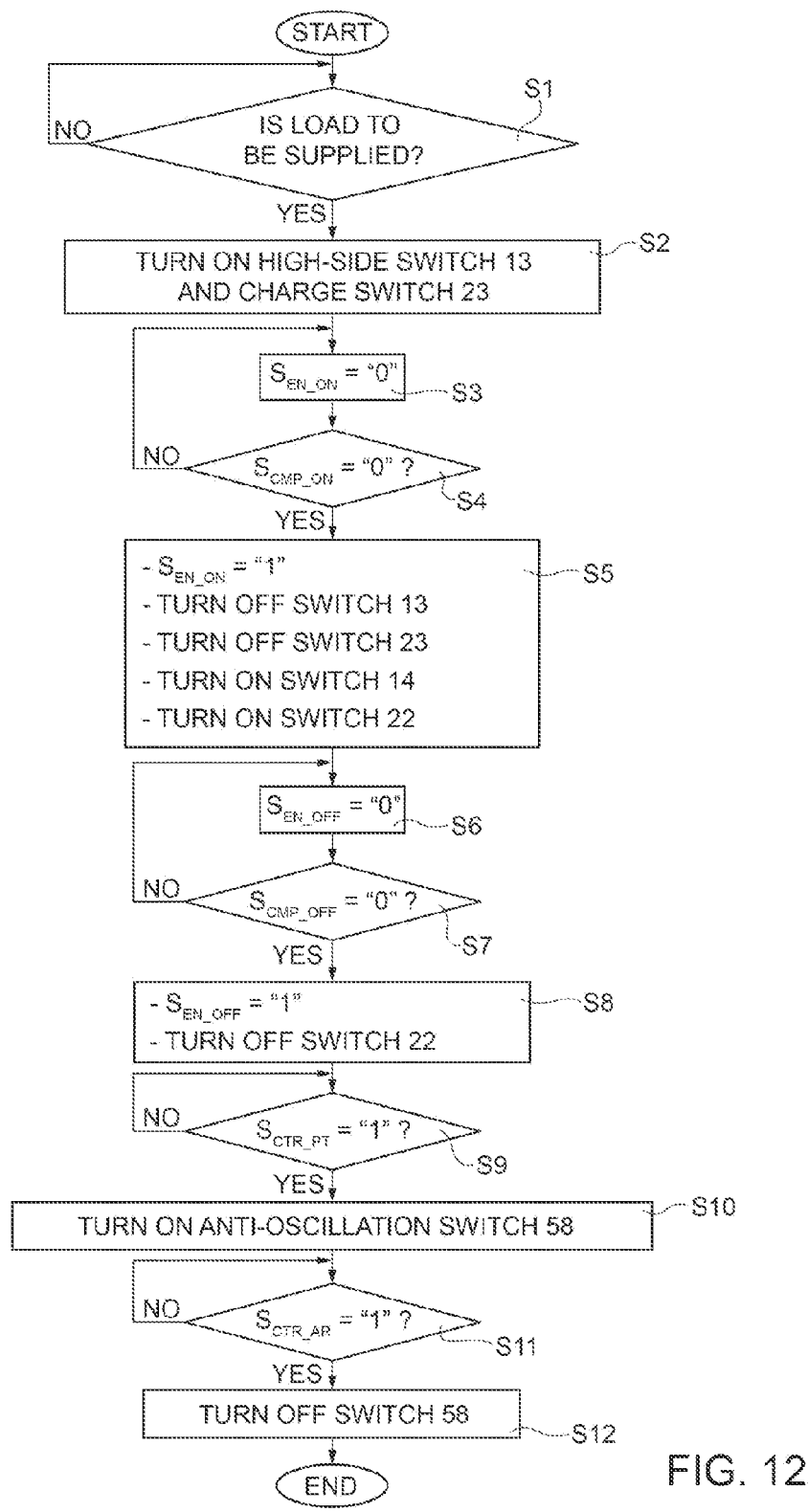
FIG. 12 shows steps of a method implemented by the control logic of FIG. 11 for operating the DC-DC converter, in order to implement the steps of FIGS. 3A-3D and 4A-4D.

In greater detail, the control logic 85 implements the steps of the method for operating the converter 10 according to FIG. 12, functioning as a state machine.

Figure 11:
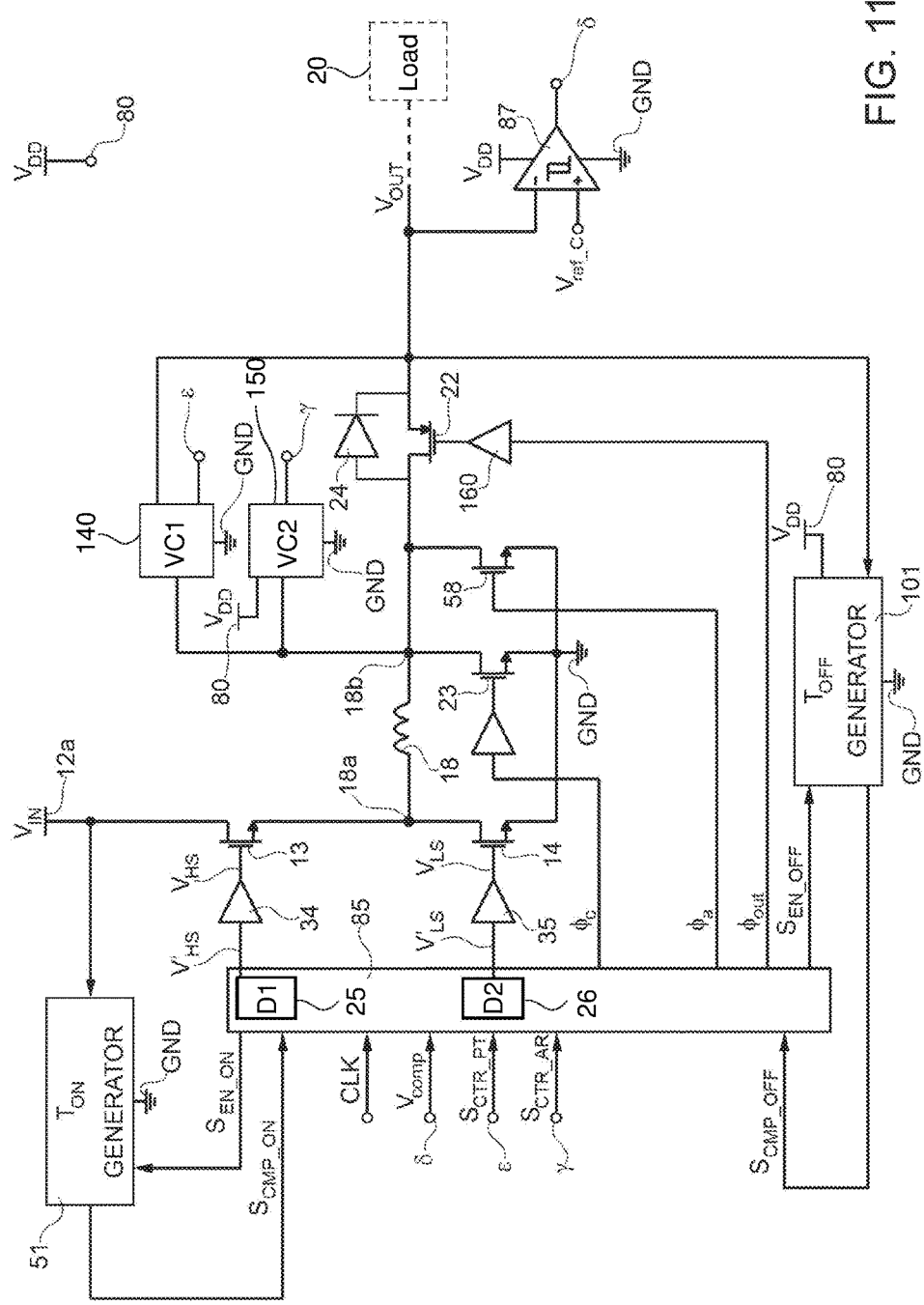
FIG. 11 shows an embodiment of the DC-DC converter comprising a control logic.

With joint reference to FIGS. 11 and 12, during an initial step (step S1), the control logic 85 verifies in the first place whether the electrical load 20 needs to be supplied. In this step, the low-side switch 14 and the charge switch 23 are ON, whereas all the other switches are OFF.

The above verification step is carried out, as has been said, on the basis of the value assumed by the signal $V_{comp}$ generated by the comparator 87. If the electrical load 20 does not have to be supplied (output NO from step S1), the logic returns into the mode of observation of the signal $V_{comp}$ and waits for the electrical load 20 to require charging. Otherwise, if the electrical load 20 is to be supplied (output YES from step S1) control passes to step S2.

In the case where the electrical load 20 does not need to be supplied, the remaining steps of FIG. 12 are not carried out. In this case, it is further envisaged that the control logic 85 will send a signal for selective turning-off of portions of the converter 10 so that a further energy saving will be guaranteed and thus an increase of efficiency of the converter itself. In detail, the control logic electrically uncouples the adaptive control blocks 51 and 101 by closing (turning off) the switches 57 shown in FIGS. 5 and 103 shown in FIG. 6.

In this initial resting step, the high-side switch 13, as likewise the coupling switch 22 and the anti-oscillation switch 58, are open (i.e., in the case of a MOSFET, OFF). Only the low-side switch 14 and the charge switch 23 are ON, thus connecting both of the terminals of the inductor 18 to the reference terminal GND.

Passage to the subsequent steps, however, determines closing of the switches 57 and 103 so that the adaptive-control blocks 51 and 101 are supplied and immediately available for operation.

In step S2, the control logic 85 opens the low-side switch 14 (by the signal $V_{LS}$) and then closes the high-side switch 13 (i.e., it turns on the transistor 13 by the signal $V_{HS}$). This operation is carried out by generating the signals $\varphi_A$ and $\varphi_B$ of FIG. 9 to close the switch 32 and open the switch 33. The signals $\varphi_A$ and $\varphi_B$ generated by the control logic 85 are voltage signals that have an amplitude appropriate for controlling the switches 32 and 33 (for example, in the case of switches 32, 33 of a MOSFET type, the voltage signals generated by the driving devices as a function of the signals $\varphi_A$ and $\varphi_B$ are such as to drive the respective MOSFETs into conduction by generating a gate-to-source voltage higher than the threshold voltage of the respective MOSFET).

As described previously, following upon generation of the signals $\Phi_A$ and $\Phi_B$, the signal $V_{HS}'$ that enables closing of the high-side switch 13 via the driving device 34 is asserted. Likewise, together with the high-side switch 13, also the charge switch 23 remains closed by the control logic 85, by the signal $\Phi_c$. The terminal 18b is thus coupled to the ground reference terminal GND. A current may thus start to flow through the inductor 18, from the terminal 12a to the terminal GND.

As soon as the high-side switch 13 conducts, the voltage on the terminal 18a starts to rise, locking to the value $V_{IN}$. At the same time, owing to the capacitive effect, since the difference of potential across the capacitor 29 remains unvaried, the voltage $V_{BOOT}$ rises, enabling the driving device 34 to generate a signal $V_{HS}$ such as to keep the high-side switch 13 in conduction. The inductor 18 may thus be charged.

As shown in step S3, which is temporally simultaneous to step S2, or immediately subsequent to step S2, monitoring of the time interval $T_{ON}$ starts by activating the first adaptive control block 51. For this purpose, the enable signal $S_{EN\_ON}$ assumes a low logic value "0", such as to drive the transistor 76 of FIG. 5 into conduction, thus charging the capacitor 84.

The control logic 85 (step S4) immediately starts monitoring of the comparison signal $S_{CMP\_ON}$ generated at output by the adaptive control block 51. During the interval $T_{ON}$, the comparison signal $S_{CMP\_ON}$ has a high logic value "1"; passage of the value of the comparison signal $S_{CMP\_ON}$ to a low logic value "0" is interpreted by the control logic 85 as the end of the interval $T_{ON}$. As long as the comparison signal $S_{CMP\_ON}$ has a high logic value "1" (output NO from step S4), the control logic 85 remains in step S4 (i.e., in the condition of FIGS. 3A, 4A). Otherwise (output YES from step S4), control passes to step S5.

Entry into step S5 determines transition from the operating condition of FIGS. 3A, 4A to the operating condition of FIGS. 3B, 4B.

In step S5, the high-side switch 13 is opened (the control logic 85 generates an appropriate signal $V_{HS}'$ such that, via the driving device 34, the high-side switch 13 is driven into the open state—transistor 13 OFF). Instead, the low-side switch 14 is closed (transistor 14 ON). Preferably, the control logic introduces a delay (dead time) between opening of the high-side switch 13 and closing of the low-side switch 14.

The low-side switch 14 is driven into the closed state by generating the signal $V_{LS}'$, which is applied, via the driving device 35, to the control terminal of the low-side switch 14. The signals $V_{LS}'$ and $V_{HS}'$ are, for example, CMOS logic signals of amplitude equal to $V_{DD}$.

Simultaneously with opening of the high-side switch 13 and, preferably, prior to closing of the low-side switch 14, the charge switch 23 is opened, thus uncoupling the terminal 18b from the ground reference GND.

The control logic 85 further generates, following upon (or simultaneously with) closing of the low-side switch 14, a signal $\Phi_{out}$ for driving the coupling switch 22 (possibly via a buffer 160 for matching the voltage level of the signal $\Phi_{out}$ to the voltage level accepted at input by the gate terminal of the transistor that constitutes the coupling switch 22). The signal $\Phi_{out}$ drives the coupling switch 22 into conduction, thus connecting the inductor 18 to the electrical load 20. The inductor 18 is thus discharged in the active mode.

During step S5 of discharge of the inductor 18, the time interval $T_{OFF}$ is monitored by the control logic 85 by operating the second adaptive control block 101. For this purpose (step S6), simultaneously with (or immediately after) closing of the switch 22, the control logic 85 sets the signal $S_{EN\_OFF}$ to the low logic value "0", thus turning on the transistor 126 and charging the capacitor 134.

The control logic 85 monitors (step S7) constantly, or at regular intervals, the value of the comparison signal $S_{CMP\_OFF}$ generated at output by the adaptive control block 101 in order to identify the end of the interval $T_{OFF}$. A high logic value "1" of the comparison signal $S_{CMP\_OFF}$ (output NO from step S7) maintains the control logic 85 in a wait state. The variation of the comparison signal $S_{CMP\_OFF}$ from the high logic value "1" to the low logic value "0" (output YES from step S7) determines the end of the interval $T_{OFF}$ and passage from the operating condition of FIGS. 3B, 4B to that of FIGS. 3C, 4C (passive supply of the load 20). This passage corresponds to the transition from step S7 to step S8.

In step S8, the control logic 85 sets the enable signal $S_{EN\_OFF}$ to the high logic value "1", thus discharging the capacitor 134. Active supply of the load 20 is concluded and consequently the control logic 85 turns off the coupling switch 22 by the signal $\Phi_{out}$.

Control then passes to step S9, in which the control logic 85 monitors the value of the control signal $S_{CTR\_PT}$: as long as the logic value of the control signal $S_{CTR\_PT}$ is low, "0", the control logic 85 remains in step S9. Instead, when the logic value of the control signal $S_{CTR\_PT}$ passes to the high value "1" (output YES from step S9), then the control logic 85 drives the anti-oscillation switch 58 into the closed state (step S10) by generating an appropriate signal $\Phi_a$. This step corresponds to the operating condition of FIGS. 3D, 4D.

After step S10, the control logic 85 goes immediately to the next step S11, where the control signal $S_{CTR\_AR}$ generated by the block 150 is acquired and monitored. Transition of the logic state of the control signal $S_{CTR\_AR}$, as already described with reference to FIG. 8, determines the end of step S11. The operating condition of FIGS. 3D, 4D terminates with opening of the anti-oscillation switch 58. The steps of supply of the load 20 have terminated and the control logic 85 returns to step S1, activating the charge switch 23 and the low-side switch 14 to maintain the terminals 18a and 18b of the inductor 18 at the reference terminal GND.

Steps S2-S12 are, for example, managed on the basis of a timing supplied by a clock signal (CLK) generated outside the circuit converter 10 or generated by a clock circuit of an integrated type. The clock frequency CLK is, for example comprised between approximately 100 kHz and approximately 400 kHz, for example approximately 230 kHz. The clock signal CLK may be generated by an oscillator circuit of a known type. On each rising edge of the clock signal a time slot is generated for the respective step of supply of the load 20, having a duration equal to the period of oscillation of the clock signal. When the output does not need to be recharged, the clock is set in sleep, i.e., low-consumption, mode and so the time slot is generated. As soon as the output needs to be charged (as determined by step S1), the state machine wakes up and restarts with generation of the time slots for supplying the electrical loads that need to be supplied.

It is evident that use of a clock signal CLK is not necessary and may be omitted. In this case, the control logic starts the operations of steps S1-S12 immediately according to the need and the entire sequence is carried out without a timing supplied by a clock.

Figure 1:
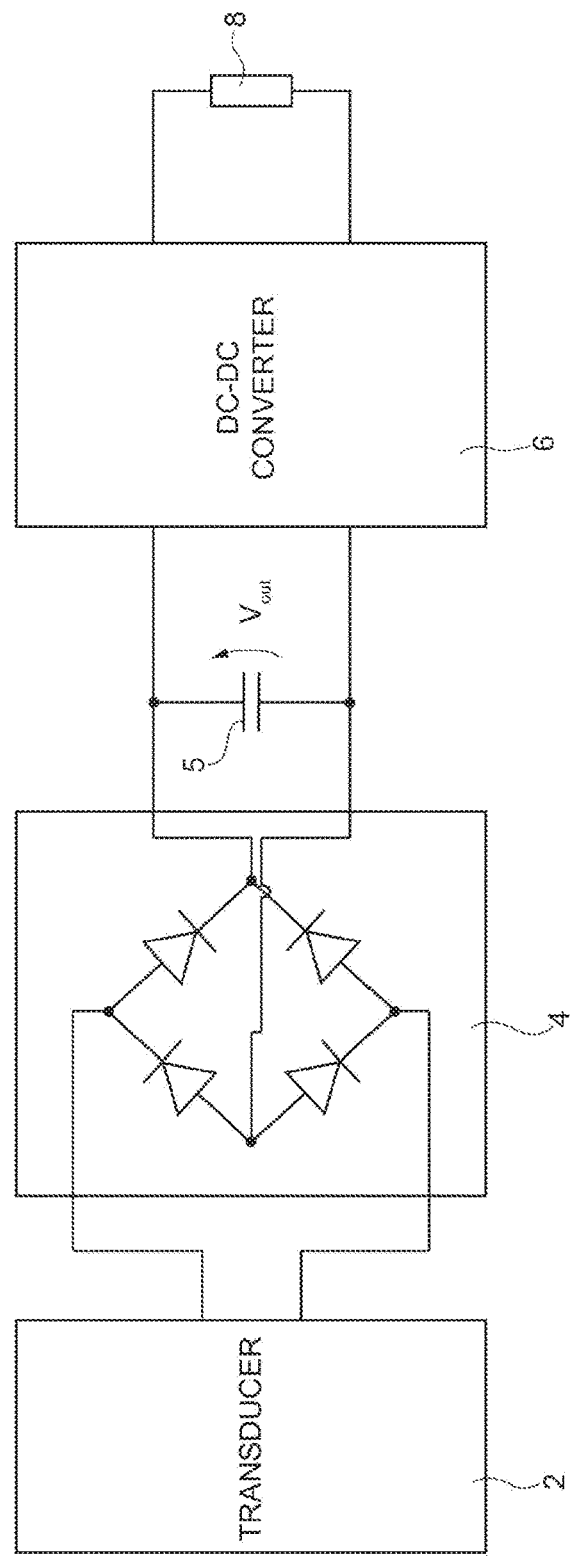
FIG. 1 shows an energy harvesting system of a known type.
Figure 13:
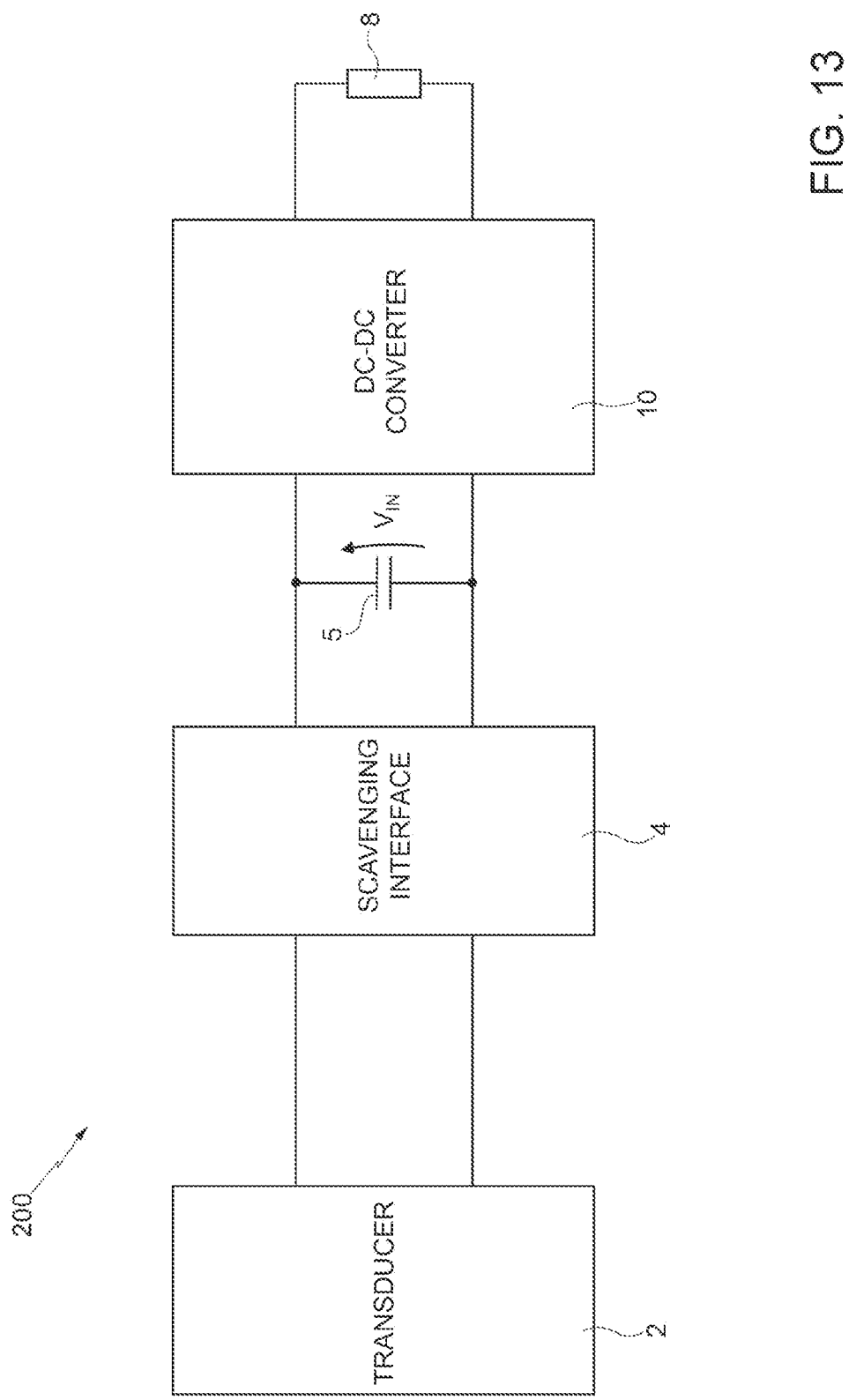
FIG. 13 shows an environmental energy harvesting system comprising the DC-DC converter of FIG. 2 or FIG. 11.

FIG. 13 shows an energy harvesting system 200 comprising the converter 10. The energy harvesting system 200 is similar to the energy harvesting system 1 of FIG. 1 (elements that are in common are designated by the same reference numbers) and is not described any further herein.

The transducer 2 may be chosen in the group comprising: electrochemical transducers (configured to convert chemical energy into an electrical signal), electromechanical transducers (configured to convert mechanical energy into an electrical signal), electroacoustic transducers (configured to convert variations of pressure into an electrical signal), electromagnetic transducers (configured to convert a magnetic field into an electrical signal), photoelectric transducers (configured to convert light energy into an electrical signal), electrostatic transducers and thermoelectric transducers.

The converter 10 is connected to the output of the scavenging interface 4. The energy stored in the storage capacitor of the scavenging interface 4 (which is of a per se known type) supplies the converter 10. The input voltage of the converter 10 is thus the voltage produced by the scavenging interface 4.

According to one application of the energy harvesting system 200, generation of electrical energy exploits the mechanical energy produced by an individual when he is walking or running. In this case, the energy harvesting system 200 is set inside the shoes of the individual in question (for example, inside the sole). In systems aimed at fitness, where counting of the steps is of particular interest, it is useful to harvest energy from the vibrations induced by walking/running to be able to supply without the use of a battery acceleration sensors and/or wireless transmitters (for example, RFID, BT, etc.), which are able to communicate with cellphones, music-player devices, or with any other apparatus concerned with providing information on the steps performed.

A further application of the energy harvesting system 200 envisages harvesting the thermal energy supplied by a source of thermal energy, e.g., through a thermoelectric transducer.

From an examination of the characteristics of the invention obtained according to the present disclosure the advantages that it affords are evident.

In particular, the converter 10 according to the present invention enables electrical supply of loads that require low supply voltages, with high efficiency using a single inductor 18.

Further, the converter 10 may be completely integrated in an energy harvesting system 200, which must typically guarantee a high level of performance and resistance in regard to stresses. The high integratability is enabled by the presence of the bootstrap network to turn on the high-side switch, which is of a type set inside (integrated in) the converter 10.

Further, the adaptive control circuit 51 enables the converter 10 to be operated in a constant-peak-current mode over a wide range of input voltages, enabling compensation of the time interval $T_{ON}$ for different values of the input voltage $V_{IN}$. Likewise, the adaptive control circuit 101, together with the control logic of the coupling switch 22, enables supply of the electrical load in a precise way, discharging the inductor completely at each step of supply of the load 20, without absorbing current from the load 20 itself and using, during the final discharging step, passive elements, thus minimizing the consumption of current by the converter 10.

Finally, it is clear that modifications and variations may be made to what has been described and illustrated herein, without thereby departing from the scope of the present invention, as defined in the annexed claims.

In particular, according to a different embodiment (not described in detail), the converter 10 may be of a SIMO (single-inductor multiple-output) type, having a plurality of outputs configured to supply a respective plurality of electrical loads. In this case, a respective plurality of coupling switches 22 is present, each of which is configured to couple the terminal 18b of the inductor 18 with a respective electrical load. For supplying the plurality of electrical loads it is possible to use, for example, a time-multiplexing technique, for example of the type described in the patent application No. EP 2518878.

Further, the present invention is irrespective of the circuit architecture of the DC-DC converter. It may be applied to any DC-DC converter of a SIMO or SISO type, for example of a buck type, of a boost type, or else of a buck-boost type.

Only in the case of a DC-DC converter of a buck type does the operating condition of charging (interval $T_{ON}$) have a duration calculated as a function of the value assumed by the input supply signal $V_{IN}$ minus the output signal $V_{OUT}$.

Likewise, only in the case of a DC-DC converter of a boost type does the time interval of active discharge of the inductor (interval $T_{OFF}$) have a duration $t_{1a}$–$t_2$ calculated as a function of the value assumed by the output supply signal $V_{OUT}$ minus the input signal $V_{IN}$.

What is claimed is:

1. A method for operating a converter including an inductor receiving an input supply voltage and supplying an electrical load with an output supply voltage, the method comprising:

charging the inductor by storing electrical charge until a maximum pre-set current value is reached, during a first operating condition in which said electrical load is not supplied;

actively supplying said electrical load by the electrical charge stored in the inductor during a first time interval of a second operating condition by actuating a charge transfer switch coupled to said electrical load and partially discharging the inductor through the charge transfer switch until an intermediate value of residual charge stored in the inductor is reached; and passively supplying said electrical load by said residual charge stored in the inductor during a second time interval, subsequent to the first time interval, of the second operating condition by deactivating said charge transfer switch and discharging the inductor through a charge transfer diode coupled to said electrical load;

wherein the converter further comprises a first adaptive control circuit including a first electrical-charge-storage device and a first signal comparator and a second adaptive control circuit including a second electrical-charge-storage device and a second signal comparator, the method further comprising:

charging the first electrical-charge-storage device, during the first operating condition, with a first charging current having a magnitude that is proportional to the input supply voltage;

generating, by the first signal comparator, a first control signal to cause termination of said charging the inductor when the charge stored in the first electrical-charge-storage device reaches a first predefined threshold;

charging the second electrical-charge-storage device, during the second operating condition, with a second charging current having a magnitude that is proportional to the output supply voltage;

generating, by the second signal comparator, a second control signal to cause termination of said actively supplying said electrical load when the charge stored in the second electrical-charge-storage device reaches a second predefined threshold, wherein said first predefined threshold indicates a maximum value that the electrical charge stored in said inductor may assume during the first operating condition and the second predefined threshold indicates the intermediate value that the electrical charge stored in said inductor may assume during the second operating condition.

2. The method according to claim 1, wherein said first operating condition has a duration calculated as a function of the value assumed by the input supply voltage.

3. The method according to claim 1, wherein the first time interval of the second operating condition has a duration calculated as a function of the value assumed by the output supply voltage.

4. The method according to claim 1, wherein the charge-transfer switch and the charge-transfer diode are connected in parallel and are coupled together between the inductor and the electrical load.

5. The method according to claim 1, wherein the converter further comprises a charge switch and a discharge switch, coupled in series to one another between a source of electrical energy that supplies the input supply voltage and a reference terminal, said inductor having a first conduction terminal and a second conduction terminal, the first conduction terminal being electrically coupled between the charge switch and the discharge switch and the second conduction terminal being electrically coupled to the ground reference terminal via a coupling switch, the method further comprising:
turning on the charge switch, by turning on the coupling switch and turning off the discharge switch, in order to charge the inductor during the first operating condition;
passing from the first operating condition to the second operating condition upon reception of the first control signal, by turning off the charge switch and the coupling switch, by turning on the discharge switch and by driving the charge-transfer switch into the active operating state; and
driving a transition from the active operating state to the passive operating state of the charge-transfer switch upon reception of the second control signal.

6. A converter for supplying an electrical load by an output supply voltage, comprising:
an input stage operatively coupled between a source of electrical energy configured to supply an input supply voltage and a reference terminal;
an inductor having a first conduction terminal and a second conduction terminal, the first conduction terminal being electrically coupled to the input stage and the second conduction terminal being selectively electrically coupled to the ground reference terminal; and
a charge-transfer switch and a charge-transfer diode connected in parallel and coupled between the second conduction terminal of the inductor and an electrical load, the charge-transfer switch being configured to electrically uncouple the second conduction terminal from the electrical load during a first operating condition in which the inductor is charged by the input supply voltage and electrically couple the second conduction terminal to the electrical load during a second operating condition in which the electrical load is supplied,
wherein in the second operating condition the charge-transfer switch is configured to operate in an active operating state in which the charge-transfer switch is closed and the electrical load is supplied from the charged inductor through the charge-transfer switch and in a passive operating state in which the charge-transfer switch is open and the electrical load is supplied from the charged inductor through the charge-transfer diode;
a first adaptive control circuit including a first electrical-charge-storage device operatively coupled to the source of electrical energy and a first signal comparator, wherein the first electrical-charge-storage device is configured to be charged, during the first operating condition, with a first charging current having a magnitude that is proportional to the input supply voltage and the first signal comparator is configured to generate a first control signal to terminate charging of the inductor by the input supply voltage when the charge stored in the first electrical-charge-storage device reaches a first predefined threshold; and
a second adaptive control circuit including a second electrical-charge-storage device operatively coupled to the electrical load and a second signal comparator, wherein the second electrical-charge-storage device is configured to be charged, during the second operating condition, with a second charging current having a magnitude that is proportional to the output supply voltage and the second signal comparator is configured to generate a second control signal to terminate the active operating state when the charge stored in the second electrical-charge-storage device reaches a second predefined threshold,
wherein said first predefined threshold indicates a maximum value that the electrical charge stored in said inductor may assume during the first operating condition and the second predefined threshold indicates an intermediate value, comprised between a zero value and said maximum value, that the electrical charge stored in said inductor may assume during the second operating condition.

7. The converter of claim 6, further comprising a control logic configured to:
control the input stage for coupling, during the first operating condition, the inductor to the source of electrical energy thus charging the inductor;
pass from the first operating condition to the second operating condition upon reception of the first control signal by driving the input stage for uncoupling the inductor from the source of electrical energy and driving the charge-transfer switch into the active operating state; and
drive a transition from the active operating state to the passive operating state of the charge-transfer switch upon reception of the second control signal.

8. The converter according to claim 6, wherein said charge-transfer switch is a transistor having an integrated diode, said active operating state corresponding to a flow of electrical charge through the channel of said transistor obtained by turning on the transistor and said passive operating state corresponding to a flow of electrical charge through the integrated diode when the transistor is OFF.

9. The converter according to claim 6, wherein said first adaptive control circuit further comprises:
a voltage-to-current converter, electrically coupled to the source of electrical energy for receiving the input supply voltage and configured to generate a first intermediate current signal correlated to the input supply voltage; and
an amplifier, configured to receive the first intermediate current signal and generating said first charging signal by amplifying the first intermediate current signal.

10. The converter according to claim 9, wherein said first adaptive control circuit further comprises a first enabling switch configured to receive the first charging signal and supply the first charging signal to said first electrical-charge-storage device and a second enabling switch configured to couple the first electrical-charge-storage device to a ground reference terminal, and control logic being configured to:
- turn on said first enabling switch and turning off said second enabling switch, during the first operating condition, thus charging the first electrical-charge-storage device; and
- turn off said first enabling switch and turning on said second enabling switch, outside the first operating condition, thus discharging the first electrical-charge-storage device.

11. The converter according to claim 6, wherein said second adaptive control circuit further comprises:
- a voltage-to-current converter configured to receive the output supply voltage and configured to generate a second intermediate current signal correlated to the output supply voltage; and
- an amplifier configured to receive the second intermediate current signal and generating said second charging signal by amplifying the second intermediate current signal.

12. The converter according to claim 11, wherein said second adaptive control circuit further comprises a third enabling switch configured to receive the second charging signal and supply the second charging signal to said second electrical-charge-storage device and a fourth enabling switch configured to couple the second electrical-charge-storage device to a ground reference terminal, and control logic configured to:
- turn on said third enabling switch and turning off said fourth enabling switch, during the second operating condition, thus charging the second electrical-charge-storage device; and
- turn off said third enabling switch and turning on said fourth enabling switch, outside of the second operating condition, thus discharging the second electrical-charge-storage device.

13. The converter according to claim 6, further comprising an output comparator configured to acquire said output supply voltage and comparing the output supply voltage alternatively with a lower supply-threshold value and with an upper supply-threshold value to generate an output comparison signal, and
- a control logic configured to acquire the output comparison signal and turn off the converter if the output supply voltage reaches the upper supply-threshold value and, alternatively, re-activating the converter, by coupling the inductor to the source of electrical energy, if the output supply voltage reaches the lower supply-threshold value.

14. The converter according to claim 6, further comprising:
- a monitoring circuit configured to monitor the electrical charge transferred through the charge-transfer switch during the passive operating state of the charge-transfer switch and to generate a monitoring signal indicating a substantially zero transfer of electrical charge to the electrical load;
- an anti-oscillation switch connected between the second terminal of the inductor and the ground reference terminal, and
- control logic configured to turn on a discharge switch and the anti-oscillation switch upon reception of the monitoring signal.

15. The converter according to claim 6, wherein the input stage comprises a charge switch and a discharge switch connected together in series, the charge switch being coupled to the source of electrical energy and the discharge switch being coupled to the reference terminal, and
- wherein the first conduction terminal of the inductor is electrically coupled between the charge switch and the discharge switch and the second conduction terminal is electrically coupled to the ground reference terminal via a coupling switch.

\* \* \* \* \*

UNITED STATES PATENT AND TRADEMARK OFFICE
CERTIFICATE OF CORRECTION

PATENT NO. : 10,116,208 B2
APPLICATION NO. : 14/603597
DATED : October 30, 2018
INVENTOR(S) : Stefano Ramorini et al.

It is certified that error appears in the above-identified patent and that said Letters Patent is hereby corrected as shown below:

In the Specification

At Column 10, Line 32, please replace [[ re-channel ]] with -- n-channel --.

At Column 11, Line 22, please replace the phrase [[ current $t_{OFF\_IN}$ is thus given by ]] with -- current $i_{OFF\_IN}$ is thus given by --.

At Column 15, Line 52, please replace the term [[ $\varphi_{dB}$ ]] with -- $\varphi_B$ --.

At Column 16, Line 26, please replace the term [[ signal V ]] with -- signal $V_p$ --.

Signed and Sealed this
Twenty-sixth Day of March, 2019

Andrei Iancu
*Director of the United States Patent and Trademark Office*